United States Patent
Xu et al.

(10) Patent No.: US 10,700,771 B2
(45) Date of Patent: Jun. 30, 2020

(54) BANDWIDTH MANAGEMENT ACROSS LOGICAL GROUPINGS OF ACCESS POINTS IN A SHARED ACCESS BROADBAND NETWORK

(71) Applicant: Hughes Network Systems, LLC, Germantown, MD (US)

(72) Inventors: Jun Xu, Takoma Park, MD (US); Chandrasekhar Sangireddi, Boyds, MD (US); Robert James Torres, New Market, MD (US); Thomas Jagodits, Poolesville, MD (US); Sandeep Ahluwalia, Gaithersburg, MD (US); Liqing Xiao, Clarksburg, MD (US); Satyajit Roy, Gaithersburg, MD (US); ALexey Razuvaev, Gaithersburg, MD (US); Yeqing Tang, North Potomac, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/129,713

(22) Filed: Sep. 12, 2018

(65) Prior Publication Data

US 2019/0013860 A1 Jan. 10, 2019

Related U.S. Application Data

(62) Division of application No. 14/480,093, filed on Sep. 8, 2014, now Pat. No. 10,110,300.

(51) Int. Cl.
*H04B 7/185* (2006.01)
*H04W 24/02* (2009.01)
*H04L 12/26* (2006.01)
*H04L 12/24* (2006.01)
*H04W 24/04* (2009.01)

(52) U.S. Cl.
CPC ..... *H04B 7/18578* (2013.01); *H04L 41/0896* (2013.01); *H04L 43/0882* (2013.01); *H04W 24/02* (2013.01); *H04W 24/04* (2013.01)

(58) Field of Classification Search
None
See application file for complete search history.

(56) References Cited

U.S. PATENT DOCUMENTS

| | | | |
|---|---|---|---|
| 7,843,964 B1 | 11/2010 | Croak | |
| 2013/0135996 A1* | 5/2013 | Torres | H04L 41/5022 370/230 |
| 2013/0136004 A1 | 5/2013 | Torres | |
| 2013/0339530 A1* | 12/2013 | Nishioka | H04L 47/41 709/226 |
| 2014/0185452 A1 | 7/2014 | Kakadia | |

\* cited by examiner

*Primary Examiner* — Yaotang Wang
(74) *Attorney, Agent, or Firm* — Sheppard, Mullin, Richter & Hampton LLP

(57) ABSTRACT

Systems and methods provide bandwidth management on the inroute of a satellite network. Inroute group managers (IGMs) monitor bandwidth usage in each terminal group (TG) under each of the IGMs, and report this bandwidth usage to a bandwidth manager. Upon receipt of the reported bandwidth usage from each of the IGMs, the bandwidth manager compares the bandwidth usage and minimum/maximum throughput rates associated with each TG. The bandwidth manager calculates scaling factors that it transmits to each of the IGMs to allow the IGMs to allocate bandwidth accordingly.

20 Claims, 11 Drawing Sheets

```
┌─────────────────────────────────────────────────────────┐
│  MONITOR OVER TIME, AT AN IGM, BANDWIDTH USAGE AND      │
│   BACKLOG WITHIN EACH TG OF A PLURALITY OF TGS          │
│   COMMUNICATING OVER INROUTES OF A PLURALITY OF IGS     │
│                          30                             │
└─────────────────────────────────────────────────────────┘
                             │
                             ▼
┌─────────────────────────────────────────────────────────┐
│   AGGREGATE INFORMATION REGARDING MONITORED BANDWIDTH   │
│           USAGE AND BACKLOG FOR EACH TG                 │
│                          32                             │
└─────────────────────────────────────────────────────────┘
                             │
                             ▼
┌─────────────────────────────────────────────────────────┐
│  DETERMINE THE AMOUNT OF BANDWIDTH BEING USED AT EACH OF│
│   THE PLURALITY OF IGS FOR EACH OF THE PLURALITY OF TGS │
│            UNDER EACH OF THE PLURALITY OF IGS           │
│                          34                             │
└─────────────────────────────────────────────────────────┘
                             │
                             ▼
┌─────────────────────────────────────────────────────────┐
│    REPORT THE DETERMINED AMOUNT OF BANDWIDTH BEING USED │
│ AND AVAILABLE CAPACITY OF THE IGM TO A BANDWIDTH MANAGER│
│                          36                             │
└─────────────────────────────────────────────────────────┘
                             │
                             ▼
┌─────────────────────────────────────────────────────────┐
│ FOR EACH TG, RECEIVE AT LEAST ONE SCALING FACTOR, FROM THE│
│  BANDWIDTH MANAGER, TO BE UTILIZED BY THE IGM TO SCALE UP│
│    OR DOWN THE BANDWIDTH USAGE OF TERMINALS OF EACH TG  │
│                          38                             │
└─────────────────────────────────────────────────────────┘
```

FIG. 2

```
┌─────────────────────────────────────────────────────────────┐
│ RECEIVE, FROM EACH IGM IN A NETWORK, BANDWIDTH USAGE DATA   │
│ REGARDING EACH TG COMMUNICATING OVER ONE OR MORE            │
│ INROUTES OF EACH IG MANAGED BY EACH IGM, AND AVAILABLE      │
│ BANDWIDTH CAPACITY OF EACH IGM                              │
│                          40                                 │
└─────────────────────────────────────────────────────────────┘
                              │
                              ▼
┌─────────────────────────────────────────────────────────────┐
│ DETERMINE TARGETED ALLOCATION OF BANDWIDTH FOR EACH TG      │
│ ACROSS EACH IGM IN THE NETWORK                              │
│                          42                                 │
└─────────────────────────────────────────────────────────────┘
                              │
                              ▼
┌─────────────────────────────────────────────────────────────┐
│ CALCULATE A SET OF SCALING FACTORS BASED ON THE TARGETED    │
│ ALLOCATION OF BANDWIDTH AND CURRENT BANDWIDTH USAGE OF      │
│ EACH TG, WHEREIN THE SET OF SCALING FACTORS ARE TO BE       │
│ UTILIZED BY EACH IGM TO SCALE UP OR DOWN BANDWIDTH USAGE    │
│ OF TERMINALS IN EACH TG                                     │
│                          44                                 │
└─────────────────────────────────────────────────────────────┘
```

FIG. 3

BANDWIDTH MANAGEMENT ACROSS LOGICAL GROUPINGS OF ACCESS POINTS IN A SHARED ACCESS BROADBAND NETWORK

CROSS-REFERENCE TO RELATED APPLICATIONS

This application is a divisional of and claims priority to U.S. patent application Ser. No. 14/480,093 filed on Sep. 8, 2014 and titled "BANDWIDTH MANAGEMENT ACROSS LOGICAL GROUPINGS OF ACCESS POINTS IN A SHARED ACCESS BROADBAND NETWORK," which issued as U.S. Pat. No. 10,110,300 on Oct. 23, 2018.

TECHNICAL FIELD

The present disclosure relates generally to broadband networks. More particularly, some embodiments of the present disclosure are directed toward systems and methods for managing bandwidth allocation for terminal groups on the return channel of a satellite beam spectrum.

BACKGROUND

Users in a shared access broadband network may be logically grouped based on the business type, policy, service agreement, and so on. These users may be spread over a large geographical area and they may access the shared bandwidth from an access point (e.g., terminal) to an aggregation point, such as a network gateway. An operator on that shared access broadband network may provide, for example, internet services to one or more groups of users that subscribe to bandwidth from the operator. Such a group of terminals may, for example, be an enterprise with terminals in multiple geographical locations, or a virtual network operator (VNO) that provides internet services to users in a large geographic area. A logical group of terminals may sometimes be referred to as a terminal group (TG). Accordingly, access to such shared bandwidth may necessitate the dynamic allocation of network resources to these TGs based on certain policies, service agreements, and actual traffic demand.

Consider, for example, a digital video broadcast satellite network such as a DVBS-2 based geosynchronous earth orbit satellite network. DVB-S2 is a digital television broadcast standard developed by the DVB project (an industry consortium), and ratified by the European Telecommunications Standards Institute (ETSI) envisioned for broadcasting services, interactive services including Internet access, and data content distribution. Signals transmitted on the forward channel may be based on the DVB-S2 standard, while signals transmitted on the return channel may be based on the Internet Protocol over Satellite (IPoS) standard. In such a network, the IP layer and link gateway may be referred to as the IP gateway (IPGW) and the satellite gateway (SGW), respectively, where the SGW may include one or more inroute group managers (IGMs) running bandwidth allocation algorithms. The data stream may be broadcast to remote network nodes such as Very Small Aperture Terminals (VSATs).

In the return direction on a satellite network, multiple VSATs may share one inroute with a certain amount of bandwidth when transmitting data. Because the VSAT traffic has different priorities, and VSATs may have different service agreements, the different types of traffic data may be regulated in different ways to meet the quality of service (QoS) requirements. In addition, due to limited bandwidth, an IGM may be congested for certain periods of time. Without appropriate traffic regulation, low priority traffic may block high priority traffic, causing unsatisfied QoS.

Existing methods for inroute bandwidth allocation in a shared access broadband network can involve generating a backlog report, transmitting the backlog report to an inroute group manager (IGM), receiving a bandwidth allocation from the IGM, and servicing priority queues and transmitting data to a satellite based on the bandwidth allocation from the IGM. As can be appreciated, such existing methods focus solely on individual inroute groups (IGs).

SUMMARY

Systems and methods are provided in various embodiments for performing hybrid centralized-distributed inroute bandwidth management for TGs in a shared access broadband network.

In accordance with one embodiment of the technology disclosed herein, a method of bandwidth management comprises monitoring, at an IGM over time, bandwidth usage and backlog within each TG of a plurality of TGs communicating over inroutes of a plurality of IGs managed by the IGM. The method further comprises aggregating information regarding the monitored bandwidth usage and backlog across the plurality of IGs, determining the amount of bandwidth being used at each of the plurality of IGs for each of the plurality of TGs under each of the plurality of IGs, and reporting the determined amount of bandwidth being used and available capacity of the IGM to a bandwidth manager. For each TG, at least one scaling factor from the bandwidth manager to be utilized by the IGM for scaling up or down the bandwidth usage of terminals in each TG is received.

In accordance with another embodiment of the technology disclosed herein, another method of bandwidth management comprises receiving, from a plurality of IGMs in a network, bandwidth usage data regarding each TG communicating over one or more inroutes of each IG managed by an IGM of the plurality of IGMs. Further still, the method comprises determining a targeted allocation of bandwidth for each TG across each of the plurality of IGMS in the network, and calculating a set of scaling factors based on the targeted allocation of bandwidth and current bandwidth usage of each TG, wherein the set of scaling factors are to be utilized by each of the plurality of IGMs to scale or down the bandwidth usage of terminals in each TG.

In accordance with still another embodiment of the technology described herein, another method of bandwidth management comprises receiving at a bandwidth manager, during an updating period, IGM inputs comprising a total number of available slots at the IGM, a bandwidth demand from each TG communicating over one or more inroutes of each IG managed by the IGM, an average slot allocation for each TG, and an estimated throughput of each TG. The method further includes: calculating a targeted slot allocation for each TG; calculating a set of scaling factors for each TG; outputting the set of scaling factors to the IGM; applying the set of scaling factors for each terminal in each TG at the IGM; and updating the average slot allocation for each TG, a total throughput of each TG, and an estimated demand of each TG. Moreover, the method comprises transmitting the updated slot allocation, total throughput, and estimated demand back to the bandwidth manager.

In accordance with another embodiment of the technology disclosed herein, a system for bandwidth management comprises a bandwidth manager configured to calculate a set of scaling factors for adjusting bandwidth usage of terminals in each of a plurality TGs communicating over one or more inroutes of each of a plurality of IGs, wherein the set of scaling factors are based on bandwidth demand from each of the plurality of TGs, a total number of available slots across each of the plurality of IGs, an average slot allocation for each of the plurality of TGs, and an estimated throughput of each of the plurality of TGs. The system further comprises an IGM configured to manage each of the plurality of IGs by applying the set of scaling factors calculated by the bandwidth manager while monitoring the bandwidth usage of the terminals and reporting updated information regarding the bandwidth demand from each of the plurality of TGs, the total number of available slots across each of the plurality of IGs, the average slot allocation for each of the plurality of TGs, and the estimated throughput of each of the plurality of TGs.

In accordance with still another embodiment of the technology disclosed herein, a method of bandwidth management involving rate conversion comprises receiving, from a plurality of IGMs in a network, bandwidth usage data regarding each TG communicating over one or more inroutes of each IG managed by an IGM of the plurality of IGMs. The method also includes determining a targeted allocation of bandwidth for each TG across each of the plurality of IGMS in the network, and calculating a set of scaling factors based on the targeted allocation of bandwidth and current bandwidth usage of each TG, wherein the set of scaling factors are to be utilized by each of the plurality of IGMs to scale or down the bandwidth usage of terminals in each TG. Determining the targeted allocation of bandwidth for each TG further comprises converting between a measured information rate prior to compression and a measured information rate after compression, the conversion comprising: determining a ratio of the measured information rate prior to compression and the measured information rate after compression; receiving, during determination of the targeted allocation of bandwidth allocation, an original information rate of each TG; and applying the ratio to the original information rate of each TG to convert the original information rate of each TG to a carried information rate for each TG.

In accordance with yet another embodiment of the technology disclosed herein, a method of bandwidth management comprises monitoring, at each of a plurality of first management entities, over time, bandwidth usage and backlog within each node group of a plurality of node groups communicating over communication channels of a plurality of communication channel groups managed by each of the plurality of first management entities. The method further comprises aggregating information regarding the monitored bandwidth usage and backlog across the plurality of communication channel groups, and determining the amount of bandwidth being used at each of the plurality of communication channel groups for each of the plurality of node groups. Further still, the method comprises reporting the aggregated information regarding the backlog, the determined amount of bandwidth being used, and available capacity at each of the plurality of first management entities to a second management entity. Additionally, the method comprises, for each node group, receiving at least one scaling factor from the second management entity to be utilized by each of the plurality of first management entities for scaling up or down the bandwidth usage of nodes in each node group.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 2 is an operational flow chart illustrating example processes performed by an inroute group manager for allocating bandwidth in accordance with various embodiments.

FIG. 3 is an operational flow chart illustrating example processes performed by a bandwidth manager for allocating bandwidth in accordance with various embodiments.

Figure 1:
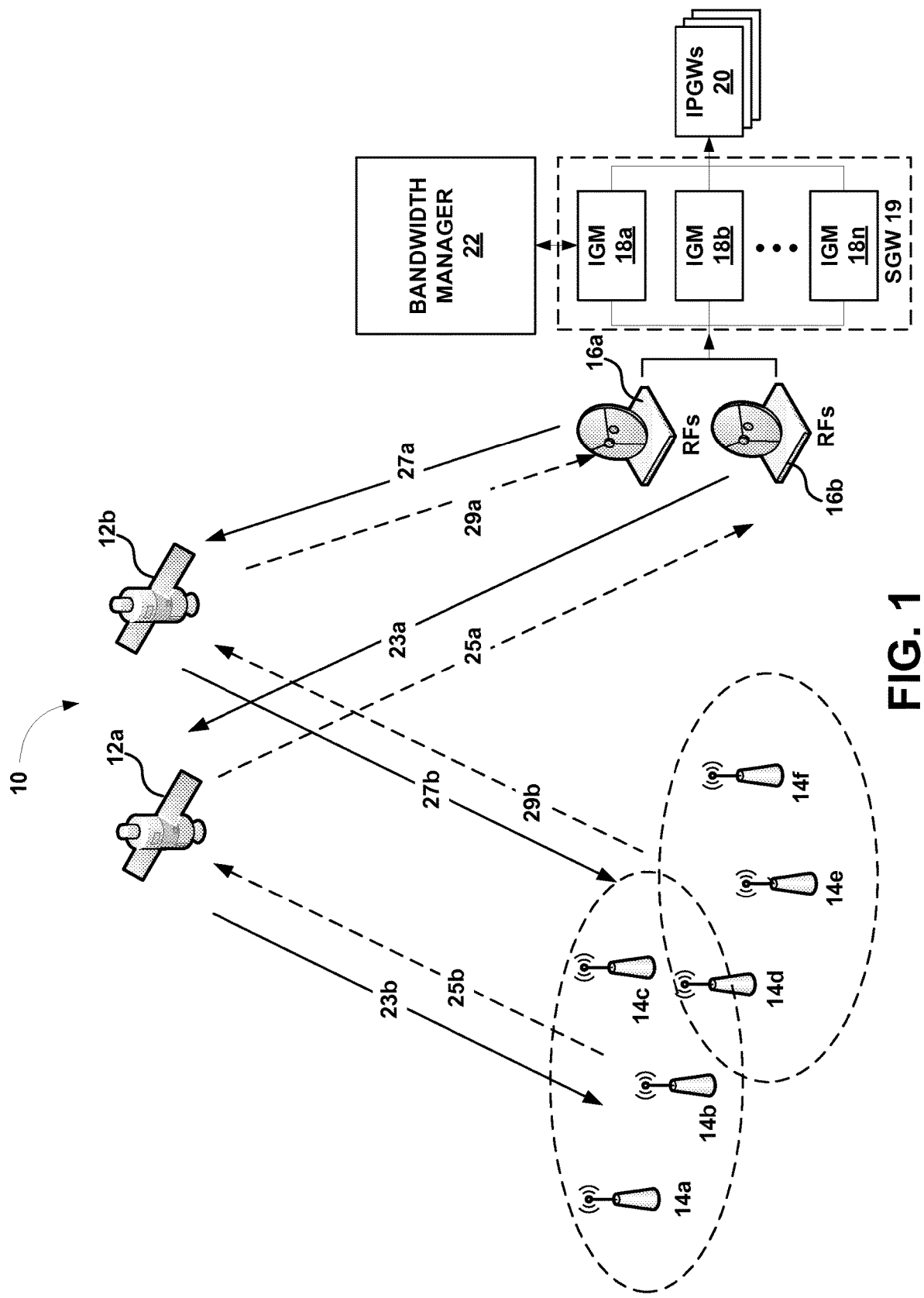
FIG. 1 illustrates an example multi-satellite data transmission system in which various embodiments can be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As noted above, terminals from a TG may be geographically separate from each other while being logically grouped together, and can be covered by different spot beams of different satellites. A shared access broadband network for which various embodiments can be implemented may be a satellite network having one or more satellites, with each satellite providing multiple beam coverage.

The spectrum of one satellite beam can be segmented into a plurality of inroutes. For example, the frequency spectrum of a satellite beam can be split into a number of inroutes with symbol rates of, for example, 512 ksps, 1 Msps, 2 Msps, 4 Msps, etc. Inroutes within a certain geographical area that share these spectrum resources can be handled hierarchically. A grouping of inroutes that are at the same symbol rate and handled as a common pool can be referred to as an inroute group (IG). IGs of multiple symbol rates can also be handled as a common pool or set. The entire shared spectrum of a given satellite spot beam may be split into several such common sets. An IGM can refer to a network entity that manages bandwidth for such a common set of multiple IGs. Depending on the digital modulation scheme that is utilized (e.g., quadrature phase shift keying (QPSK)), the number of symbols used to communication can vary, and as such, the symbol rate can also vary.

It should be noted that an IGM can be independent of a particular satellite, but an inroute is dependent on an IGM. Therefore, an IGM can manage inroutes of different satellites, but any one particular inroute may be managed by only a single IGM. These features of a satellite network can be leveraged to allocate bandwidth for and govern network usage of TGs over a multi-satellite network.

Accordingly, various embodiments of the systems and methods disclosed herein provide techniques for bandwidth management among TGs in a shared access network. Such techniques may be applicable to network resources providing service in the same direction, e.g., from an access point to an aggregation point or from an aggregation point to an access point.

In some embodiments, an IGM determines current or actual bandwidth usage for terminals in multiple TGs that share inroutes managed by the IGM. The IGM shares this information with a bandwidth manager, which evaluates the current or actual throughputs of the TGs against their respective subscribed rates. Depending on the throughput of a TG relative to its minimum and maximum subscribed rates, the bandwidth manager issues a scaling factor for that TG, which either increases, decreases or maintains the throughput of that TG.

The IGM receives the scaling factors from the bandwidth manager and applies these factors to their respective terminals in its TGs. Thus, each IGM may perform throughput management via bandwidth allocation for terminals in multiple TGs that share inroutes managed by the IGM. And accordingly, the bandwidth manager can perform throughput management of individual TGs throughout an entire network, which may contain multiple IGMs.

Throughput can refer to the rate at which digital bits of information are transferred over some communication channel and can be measured in, e.g., bits/second or in the case of data packets, in data packets/second or data packets/time slot. Throughput can be considered, essentially, to be synonymous with digital bandwidth consumption.

At the bandwidth manager level, bandwidth management can be considered to be "centralized" in that throughput can be managed network-wide for each TG (based on congestion status of the network and subscription rate profile/plan). At the IGM level, bandwidth management can be considered as being "distributed" in that an IGM can perform throughput management (independently of other IGMs), where the maximum throughput level to which a terminal (in a TG) is entitled can be realized. Accounting for all of these considerations can be accomplished through the use of a scaling factor that can be introduced by the bandwidth manager at the IGM level (for each TG) that is based on the available bandwidth of an IGM and the throughput of each TG. Hence, a hybrid, centralized-distributed feedback control mechanism may be achieved for managing bandwidth in accordance with various embodiments. It should be noted that although various embodiments for providing bandwidth management are described in the context of the inroute, various embodiments can be implemented for bandwidth management on the outroute as well. Various embodiments are also applicable to any wireless or wireline networks where throughput limits based on subscribed rates need to be imposed upon a group of users that may be spread over different IGM sub-systems or geo-locations inside the network.

It should be noted that although various embodiments described herein are directed to the aforementioned hybrid, centralized-distributed feedback control mechanism, other embodiments contemplate the ability to be implemented as a completely centralized solution, e.g., where the bandwidth manager controls bandwidth management. Alternatively still, a completely decentralized implementation is also possible from an IGM-level perspective.

As alluded to above, an IGM may perform throughput management via bandwidth allocation for terminals in multiple TGs that share inroutes managed by the IGM. A TG in a network can be bounded by/associated with a subscription rate plan/profile. The IGM is also aware of, e.g., what terminals in a TG exist, where those terminals may be operating and with what IG they are associated, in addition to how much bandwidth each terminal in the TG is using. Accordingly, on the inroute, the IGM can manage IGs while tracking the throughput of each terminal in a particular TG and across multiple TGs if necessary.

The IGM can report this tracked throughput information/bandwidth usage to a (centralized) bandwidth manager. As also alluded to above, a bandwidth manager can perform throughput management of individual TGs throughout an entire network, which may contain multiple IGMs. That is, the bandwidth manager can monitor bandwidth usage for each TG across multiple IGMs, and determine whether or not the bandwidth usage remains within the parameters/limits of the subscription rate plan associated with each TG. If the throughput remains within the subscription rate plan parameters, the bandwidth manager may simply allow the terminals, TGs, and IGs to operate in the manner with which they are currently operating. In accordance with some embodiments, the bandwidth manager can also "scale up" the applicable throughput where there is sufficient available bandwidth. On the other hand, and if the throughput of a TG exceeds or at the least begins to approach the subscription rate plan limits for bandwidth usage, the bandwidth manager can instruct the IGM managing the IG with which the TG is associated, to throttle down on bandwidth consumption until the subscription rate plan limits can be met or are no longer exceeded. Hence, the IGM can react to bandwidth manager control (when needed) via a scaling factor in order to remain within the bandwidth usage parameters of a TGs subscription rate plan. It should be noted that because, as described above, symbols can be divided, use of a scaling factor at an IGM to "indirectly" adjust bandwidth allocation can be preferable to some manner of centralized control in certain scenarios.

Each IGM can manage multiple channels, e.g., two inroutes having symbol rates of 4 Msps. On the inroute, the bandwidth manager is aware of the subscription rate for each TG. By way of the IGM reporting, the bandwidth manager is also aware of how much bandwidth each terminal/TG is consuming within each applicable IGM and across multiple IGMs.

FIG. 1 illustrates an example satellite network 10 in which elements involved in inroute communications/traffic are described. Satellite network 100 in this example can include multiple satellites 12a and 12b, remote terminals 14a-14f, radio frequency (RF) terminals 16a and 16b, multiple IGMs 18a, 18b, . . . 18n, SGW 19, IPGWs 20, and a bandwidth manager 22. The satellite network may be a shared access broadband network. Other types of shared access networks may include, for example, wireless networks such as 4$^{th}$ Generation Long Term Evolution (4G LTE) and WiMAX networks, which may include terminals other than VSATs, such as cellular and WiFi equipped devices.

Feeder links may carry data between RF terminals 16a and 16b and satellites 12a and 12b, and may include: forward uplinks 23a and 27a for transmitting data from RF terminals 16a and 16b to satellites 12a and 12b, respectively; and return downlinks 25a and 29a for transmitting data from satellites 12a and 12b, respectively, to RF terminals 16a and 16b. User links may carry data between satellites 12a and 12b and remote terminals 14a-14f, and may include: return uplinks 25b and 29b for transmitting data from remote terminals 14a-14f to satellites 12a and 12b, respectively; and forward downlinks 23b and 27b for transmitting data from satellites 12a and 12b, respectively, to remote terminals 14a-14f. Forward uplinks 23a, 27a and forward downlinks 23b, 27b may form an outroute, and return uplinks 25b, 29b and return downlinks 25a, 29a may form an inroute. SGW 19 may include high capacity earth stations with connectivity to ground telecommunications infrastructure. SGW 19 may be communicatively connected to RF terminals 16a and 16b. RF terminals 16a and 16b may be the physical equipment responsible for sending and receiving signals to and from satellites 12a and 12b, respectively, and may provide air interfaces for SGW 19/IPGWs 20.

Satellites 12a and 12b may be any suitable communications satellites. For example, satellites 12a and 12b may be bent-pipe design geostationary satellites, which can accommodate innovations and variations in transmission parameters, operating in the Ka-band. Satellites 12a and 12b may use spot beams as well as frequency and polarization reuse to maximize the total capacity of satellite network 10. Signals passing through satellites 12a and/or 12b in the forward direction may be based on the DVB-S2 standard (ETSI EN 302 307) using signal constellations up to and including at least 16-APSK. The signals intended to pass through satellites 12a and 12b in the return direction (toward terminals 14a-14f) may be based on the Internet Protocol over Satellite (IPoS) standard (ETSI TS 102 354). Other suitable signal types may also be used in either direction, including, for example higher data rate variations of DVB-S2.

IPGWs 20 may be an ingress portion of a local network. IP traffic, including TCP traffic, from the internet may enter an SGW 19 through IPGWs 20. IPGWs 20 may each include a spoofer, which may acknowledge IP traffic, including TCP traffic sent to SGW 19. Moreover, SGW 19 may be connected to an internet through IPGWs 20. IP traffic, including TCP traffic, from the internet may enter SGW 19 through IPGWs 20. As illustrated in FIG. 1, multiple IPGWs may be connected to a single IGM. The bandwidth of RF terminals 16a and 16b can be shared amongst IPGWs 20. At each of IPGWs 20, real-time (RT) and NRT traffic flows may be classified into different priorities. These traffic flows may be processed and multiplexed before being forwarded to priority queues at SGW 19. RT traffic may go directly to an RT priority queue or SGW 19, while NRT traffic flows may be serviced based on the respective priority and volume. Data may be further packed into DVB-S2 code blocks and stored in a code block buffer before transmission.

Data from an internet intended for remote terminals 14a-14f (e.g., VSATs) may be in the form of IP packets, including TCP packets and UDP packets, or any other suitable IP packets, and may enter SGW 19 at any one of IPGWs 20, where the respective spoofer may send an acknowledgment back to the sender of the IP packets. The IP packets may be processed and multiplexed by SGW 19 along with IP packets from other IPGWs, where the IPGWs may or may not have the same service capabilities and relative priorities. The IP packets may then be transmitted to satellites 12a and 12b on forward uplinks 23a and 27a using the air interfaces provided by RF terminals 16a and 16b. Satellites 12a and 12b may then transmit the IP packets to the VSATs using forward downlinks 23b and 27b. Similarly, IP packets may enter the network via the VSATs, be processed by the VSATs, and transmitted to satellites 12a and 12b on return uplinks 25b and 29b. Satellites 12a and 12b may then send these inroute IP packets to the SGW 19/IPGWs 20 using return downlinks 25a and 29a.

Each of remote terminals 14a-14f can be, for example, VSATs and may connect to the Internet through satellites 12a and 12b and IPGWs 20/SGW 19. For example, remote terminal 14a may be used at a residence or place of business to provide a user with access to the Internet. VSATs or Mobile Satellite Terminals (MSTs), may be used by end users to access the satellite network, and may include a remote satellite dish for receiving RF signals from and transmitting RF signals to satellite 12a, as well as a satellite modem and other equipment for managing the sending and receiving of data. They may also include one or more remote hosts, which may be computer systems or other electronic devices capable of network communications at a site.

At SGW 19, one or more IGMs can be implemented (IGMs 18a, 18b, . . . 18n). These IGMs may be bandwidth controllers running bandwidth allocation algorithms. The IGMs may assign bandwidth to the remote terminals 14a-14f in the form of inroute and IGs, based in part on bandwidth demand requests from the remote terminals 14a-14f.

In various embodiments, bandwidth management on the inroute can be performed by bandwidth manager 22 that can perform throughput management of individual TGs throughout an entire satellite network, e.g., satellite network 10, which may contain a plurality of IGMs. IGMs 18a-18n can perform throughput management via bandwidth allocation for terminals 14a-14f of multiple TGs that share inroutes managed by IGMs 18a-18n. The group of terminals and inroutes managed by an IGM when performing bandwidth management can be referred to as an IGM Sub-System.

Throughput, as described herein, can refer to overall throughput, minimum guaranteed throughput, as well as terminal-specific throughput (if it exceeds the overall throughput of a TG). Throughput can be defined by operator policy. The throughputs that are to be monitored/policed in accordance with various embodiments are enforceable across an entire TG. Given the logical and physical characteristics of TGs, throughput can be policed/enforced for terminals in the TGs either independently of their geographical distribution, or by taking into account geographical distribution. In addition, the total actual bandwidth of a given set of resources in a geographic region can be managed while meeting these TG throughput constraints.

It should be noted that a network can be over-subscribed. That is, a total subscribed rate of all TGs in a network may exceed that network's total capacity in one or more geographic areas. Furthermore, the terminals of a TG may be physically spread across the network. Therefore, these terminals may be controlled by different gateways in different beams or even different satellites. Accordingly, various embodiments can accomplish the following: managing overall resource usage while meeting individual TG throughput requirements for terminals in a TG utilizing a shared resource for a given shared resource; managing the overall throughputs of a TG across all shared resources; and efficiently utilizing a given shared resource while overall resource use for a TG is being determined.

FIG. 2 is an operational flow chart illustrating example processes that can be performed by an IGM (in conjunction with additional processes performed by a bandwidth manager) for managing bandwidth in accordance with various embodiments. At operation 30, an IGM monitors, over time, the bandwidth usage and backlog within each TG of a plurality of TGs communicating over inroutes of a plurality of IGs. The bandwidth usage within each TG is reflective of the throughput associated with each TG. At operation 32, information regarding the monitored bandwidth usage and backlog for each TG is aggregated. At operation 34, the amount of bandwidth being used at each of the plurality of IGs for each of the plurality of TGs under each of the plurality of IGs is determined. That is, the IGM may determine how much bandwidth is being used for each TG (at the IG level). At operation 36, the determined amount of bandwidth being used and available capacity of the IGM is reported to a bandwidth manager. At operation 38, at least one scaling factor is received for each TG from the bandwidth manager, wherein the at least one scaling factor is to be utilized by the IGM for scaling up or down the bandwidth usage of terminals in each TG.

FIG. 3 is an operational flow chart illustrating example processes that can be performed by a bandwidth manager (in conjunction with the aforementioned processes performed by the IGM) for managing bandwidth in accordance with various embodiments. At operation 40, bandwidth usage data regarding each TG communicating over one or more inroutes of each IG managed by each IGM and available bandwidth capacity of each IGM is received from each IGM in a network. This is the information reported by the IGM to the bandwidth manager described at operation 36 of FIG. 2. At operation 42, a targeted allocation of bandwidth for each TG across each IGM in the network is determined. As described above, this targeted allocation of bandwidth can be considered the target throughput for a TG. As also described above, throughput of a TG can be set by virtue of operator policy/subscription rate profile. At operation 44, a set of scaling factors based on the targeted allocation of bandwidth and the current bandwidth usage of each TG are calculated, wherein the set of scaling factors are to be utilized by each IGM to scale up or down the bandwidth usage of terminals in each TG (i.e., described at operation 38 of FIG. 2). That is, the IGM can utilize the scaling factors to throttle down if the current bandwidth usage exceeds the predetermined throughput of the TG as well as maintain or scale up the current bandwidth usage if the predetermined throughput (maximum subscription rate) of the TG has not yet been reached during scheduling of inroute bandwidth allocation.

As can be appreciated, the generation of scaling factors to be used by the IGM based upon information reported by the IGM, results in a feedback control loop. The bandwidth manager can "indirectly" control throughput while the IGM can "directly" address throughput in accordance with, e.g., QoS constraints/requirements. Again, bandwidth management as performed in accordance with various embodiments is a hybrid of centralized-distributed bandwidth management for TGs. The bandwidth manager can control the TGs' throughput via each IGM in a centralized fashion by assigning scaling factors that can be utilized by the IGM, while the IGM can manage the throughput of a TG by controlling the throughput of each terminal by actually utilizing the scaling factors in a distributed manner.

In particular, the centralized aspect of the bandwidth management arises at the network level, where a throughput target is dynamically calculated for each TG based on congestion status as well as per each TG's subscription profile. The scaling factor can then be introduced for each individual TG of each IGM Sub-System in the network. The actual throughput of a TG in each IGM Sub-System, as well as the overall network may also be instantly measured. If a TG's actual throughput is larger than its throughput target, the scaling factor can be decreased; otherwise, the scaling factor can be increased or maintained. The scaling factor as previously described, can be applied to each TG of each IGM Sub-System.

The distributed aspect of bandwidth management occurs when a terminal accesses the network at an IGM Sub-System. A terminal is entitled to a maximum throughput rate based on its subscription profile. A network scheduler may assure the terminal is afforded this maximum throughput when a terminal is scheduled. The scaling factor can govern how often a terminal is scheduled to access the network resource when competing with terminals such that the maximum throughput the terminal is entitled to can be realized. Because the scaling factors are different for different TGs, the average per-terminal throughput may be different. In a congested IGM Sub-System with more terminals competing for the same bandwidth, a larger scaling factor may result in a terminal accessing the network resource more often, thereby resulting in higher throughput. Conversely, the use of a smaller scaling factor can lead to lower throughput. In a less congested IGM Sub-System with fewer terminals competing for bandwidth, the scaling factor may be small due to the TG's bandwidth usage in other IGM Sub-Systems. However, even with a smaller scaling factor the IGM Sub-System can allow a terminal to frequently access the network bandwidth. Accordingly, there is less throughput degradation (or none at all) in such an IGM Sub-System.

Benefits of utilizing such a hybrid centralized-distributed feedback control mechanism include the following: the ability of a centralized network controller to govern actual throughput of TGs in line with subscription policies during both congested and uncongested periods; and, by virtue of the (distributed) feedback control loop, a local IGM Sub-System is able to autonomously perform scheduling such that terminals access a network resource based on the local congestion status, thereby avoiding inefficient resource utilization for a network with uneven traffic distribution across IGM Sub-Systems.

It should be noted that IGMs can balance intra-IGM TG resources at every frame (where, one frame can be, e.g., 45 ms). This balancing can be performed by backlog-based scheduling and adaptive periodic bandwidth allocation. In turn, the Bandwidth Manager may balance inter-IGM TG resources per unit period. Such a unit period can be determined as being 1 super frame (8 frames).

Figure 4:
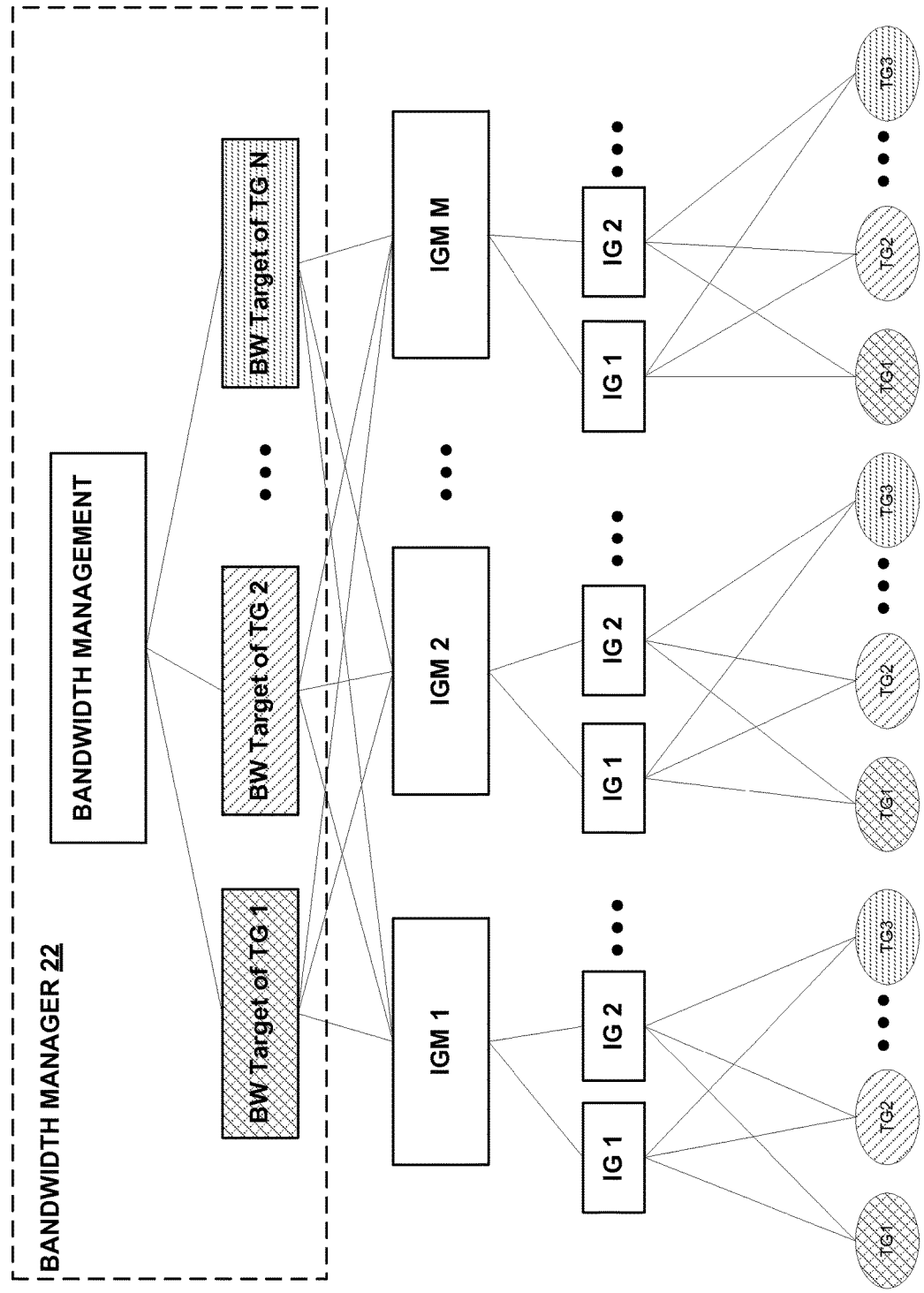
FIG. 4 is a diagrammatic representation of an example system structure in which various embodiments can be implemented.

To reinforce understanding of the aforementioned methods of bandwidth allocation at the IGM and bandwidth manager, an example system structure is described in FIG. 4. FIG. 4 illustrates bandwidth manager 22 as managing the inroute spectrum resource for N number of TGs over M number of IGMs. Each IGM manages terminals that belong to the TGs. One IGM may manage one or several IGs, where each IG may include several inroutes with the same symbol rate. For example, one IG may have inroutes (return channels) of 2 Msps, while another IG having inroutes of 1 Msps.

Terminals belonging to one TG may be spread across different IGs in one IGM and across different IGMs. Each TG may have its own subscribed throughput limit, i.e., a "maximum throughput rate" (also referred to as subscription/subscribed rate). The aggregate bandwidth consumption of terminals in a TG may use as much bandwidth up to the maximum throughput rate. Subject to a TG's type, there may be a weight associated with the TG. When the network is uncongested, a TG's subscribed rate may be satisfied. When the network is congested, the overall network bandwidth may be allocated based on TG weighting, maximum throughput rates, or a combination of both.

The geographical distribution, channel conditions, and traffic intensity of terminals in each TG may vary over time. Accordingly, bandwidth manager 22 can dynamically manage the spectrum resources of the inroute so that bandwidth can be efficiently utilized, while the quality of service (QoS) and throughput requirements of each TG can be fairly satisfied (e.g., allocation of bandwidth to a TG is proportional relative to its maximum throughput rate/pre-assigned weighting)

Figure 5:
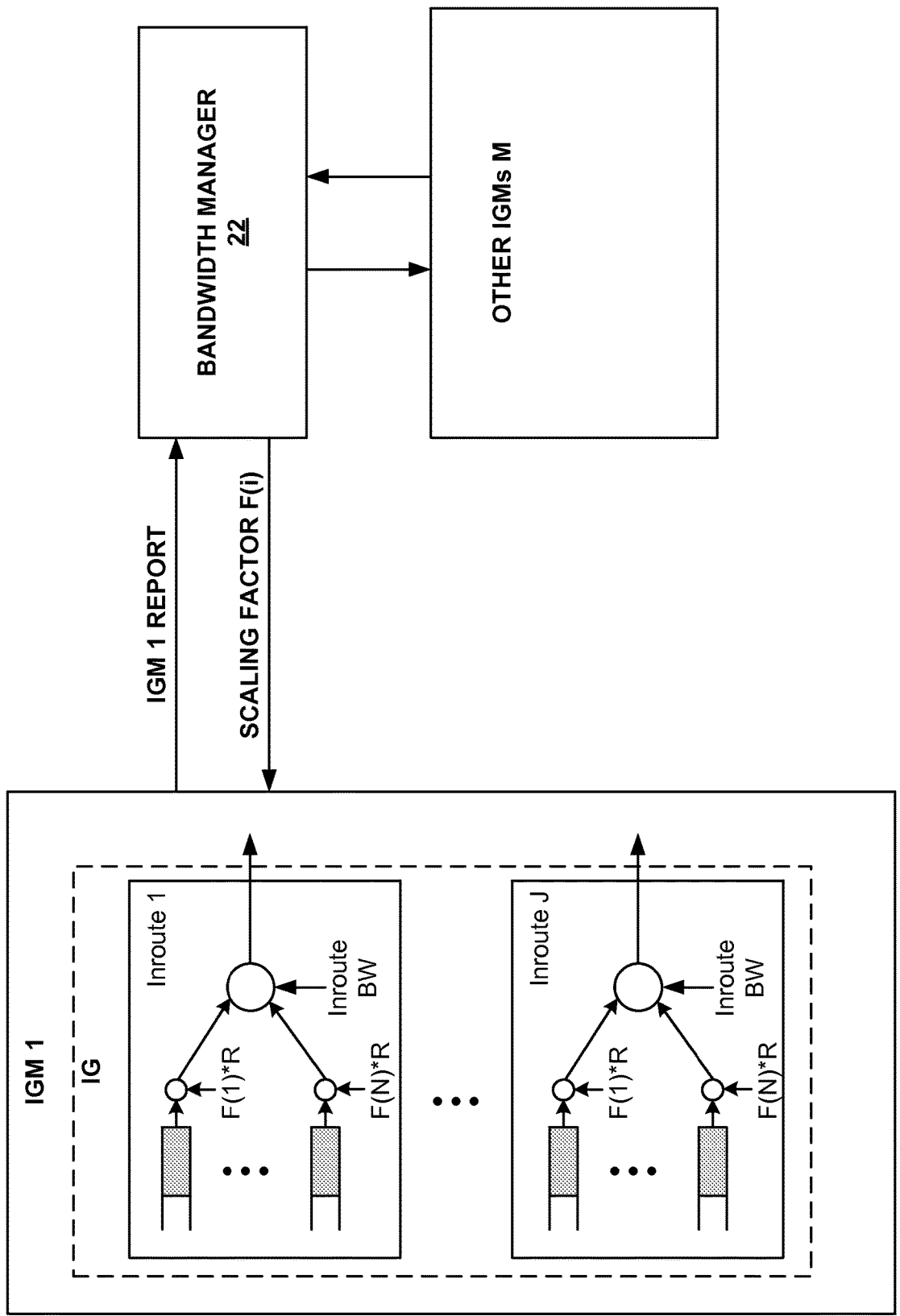
FIG. 5 is a diagrammatic representation of a feedback control loop for bandwidth management in accordance with various embodiments.

FIG. 5 illustrates an example schematic representation of the feedback aspect of bandwidth management in accordance with various embodiments. FIG. 5 illustrates N number of TGs. The terminals of these TGs are distributed across M number of IGMs, one of which, IGM 1, is illustrated in detail. In IGM 1, there can be multiple inroutes J, i.e., return channels. There can also be multiple terminals sharing the bandwidth of one inroute. It is possible that one particular inroute services one or more terminals from one or all of the TGs. R can denote the maximum throughput rate of a terminal, where terminals could have different maximum throughput rates.

Upon IGM 1 reporting its available bandwidth/capacity, backlog, and each TG's throughput, to bandwidth manager 22, bandwidth manager 22 can determine each TG's target throughput and calculate the appropriate scaling factor(s), F(i), I=1, . . . , N for each TG. Other IGMs M may interact similarly with bandwidth manager 22, and receive their respective scaling factor(s) for utilizing with the TGs of IGMs M. Therefore, bandwidth manager can "command" or control inroutes of an IG by virtue of the scaling factor(s).

Figure 6:
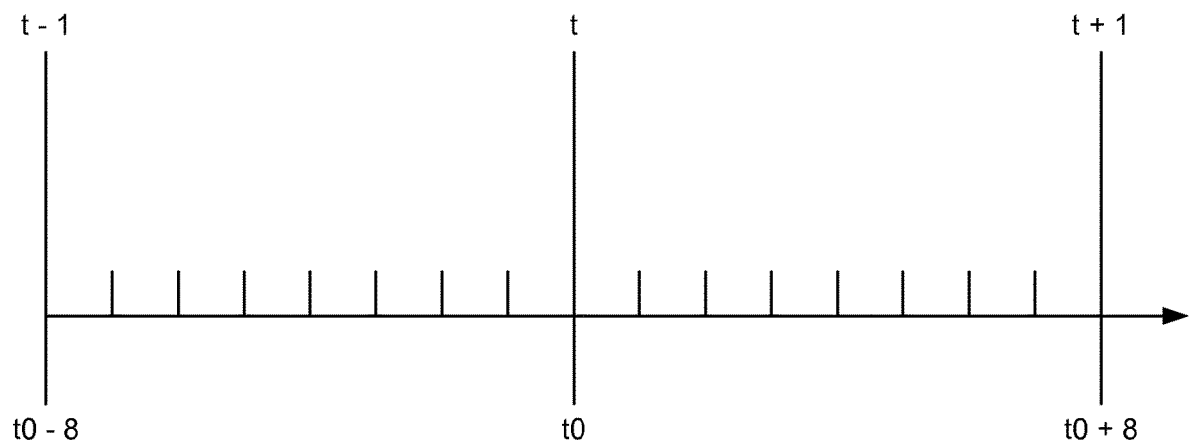
FIG. 6 illustrates an example updating period for bandwidth management in accordance with various embodiments.

As alluded to above, bandwidth allocation can occur periodically, e.g., per unit period which can be κ frames. Accordingly, for an updating period, TG(i), i=1, . . . , N, can denote TG I, wherein there are N TGs in total. IGM(j), j= 1, . . . , M, can denote IGM j, where there may be M IGMs overall in a network. As illustrated in FIG. 6, time t0 and t can denote the time tick of a frame and updating period, respectively. $T_0$ can be the updating period of bandwidth management for TGs, wherein one updating period can comprise multiple frames. $T_0$ can be a configuration parameter to be set as a multiple of a super frame, i.e., $T_0$=8 frames, 16 frames, etc.

In accordance with one embodiment, a single updating period can equal one super frame, i.e., $T_0$=8 frames=1 super frame. This can be used to count the bandwidth for conversational CBR (Constant Bit Rate) services. CBR may be considered to be a Voice over IP (VoIP) service. For bandwidth management, either the 45 ms frame or the updating period can be used as a timing unit for throughput or slot allocation. In accordance with one embodiment, the updating period (referred to as period) is used because the slot allocation for the CBR service is based on super frames. For slot allocation, a unit of slots/period can used, while for throughput, the units bytes/period, kbps, or Mbps can be used. Converting slots/period to slots/frame may be done by dividing the former with $T_0$. Examples described herein use slots/period and bytes/period as the units of the updating period and throughput/slot allocation.

Within the same beam, a terminal may be moved across inroutes or even IGs for load balancing purposes. However, this is not the case for terminals that may belong to different beams. However, the terminals of a TG may spread across multiple beams. Such a situation can create difficulties in bandwidth management as the load could be unbalanced for different beams. Accordingly, both scenarios are addressed in accordance with various embodiments, where generic notations can apply to both multi-beam and single-beam cases.

Recalling that each IGM can report its available bandwidth capacity to the bandwidth manager, and assuming M number of IGMs (covering M beams), the total available IGM capacity (unit: slots/period) can be defined as follows:

$$C_{IGM-total}^{(slot)}(t) = \sum_{j=1}^{M} C_{IGM,j}^{(slot)}(t),$$

where $C_{IGM,j}^{(slot)}(t)$ is the capacity in slots/period for the j-th IGM. The total available capacity of the IGM may or may not include those assigned for CBR. In this example, the available capacity of an IGM contains all the available slots of all regular inroutes, including those assigned to CBRs.

In accordance with one embodiment, the capacity of an IGM does not include dedicated inroutes or IGs. This is because the applicable resource(s) of those inroutes or IGs are dedicated/reserved for certain TGs, and are not available for other TGs to share.

Capacity in terms of kbps or bytes/period may be difficult to obtain as different terminals use different modulation and coding schemes, as discussed above. However, estimating the throughput per terminal based on the slot allocation is sufficient. Furthermore, the discontinuation of an IG's bandwidth, i.e., the segmenting of an IG's bandwidth by each inroute, in addition to the ability of a terminal to access one inroute at a time, it is possible that some capacity of an IG is not accessible by the terminals.

Accordingly, an IGM's capacity can be defined as including only that capacity of IGs that are accessible by terminals. Specifically, the following parameters can be defined: Applicable Capacity of an IG (in slots/period)=the Capacity of an IG; total Rate Plan of an IG (in slots/period)=the summation of active terminals' rate plans in terms of most conservative modulation/code rate; and Accessible Capacity of an IG (in slots/period)=Min [The total Rate Plan of an IG, The Applicable Capacity of an IG]. The Available Capacity of IGM j, $C_{IGM,j}^{(slot)}(t)$, is given by $C_{IGM,j}^{(slot)}(t)$ (in slots/period)= Sum of the Accessible Capacity of IGs in IGM j, j=1, . . . , M, where M is the number of IGMs.

For example, if an IG has four 2 Msps inroutes and only one active terminal with a 2 Mbps rate plan, it would be preferable not use all the symbol rates (8 Msps), Instead, using (QPSK,1/2), the accessible capacity would be Min[2 Mbps/(2*1/2), 4*2 Msps]=2 Msps (in equivalent amount of slots/period). Regardless of the actual modulation/code rate of terminals, the most conservative modulation/code rate (QPSK,1/2) is applied to simplify the implementation.

Some exceptions, however, can arise regarding the calculation of accessible capacity. For example, when an IG has ten 512 ksps inroutes and one terminal with a 2 Mbps rate plan, the calculated accessible capacity would be 2 Msps, while the actual accessible capacity is only 512 ksps. However, such cases are rare in practical use, and the impact on the bandwidth management is negligible, and can therefore be ignored.

Variables $m_k$ and $r_k$ can represent modulation and coding rate, respectively, for terminal k. The information bits per symbol is $m_k \cdot r_k$. Variable $s_0$ can refer to the number of symbols per slot ($s_0$=120 symbols/slot is one example). It should be noted that the number of symbols per slot, $s_0$, is constant even though the symbol rate of an inroute may vary.

A TG is configured with minimum and maximum throughput when subscribing to a network service, where $R_{TG, min}^{vol}(i)$ and $R_{TG, max}^{vol}(i)$ (unit: bytes/period) represent the minimum and maximum subscription throughputs of TG(i), i=1, . . . , N.

In terms of slot usage, the slot allocation (in slots/period) for TGs can be weighed proportionally to the respective maximum throughput if the average spectrum efficiency, i.e., $m_k \cdot r_k$ (of all terminals), is the same for different TGs. For a typical inroute with QPSK modulation, $m_k$=2, $r_k \in \{½, ⅔, ⅘, 9/10\}$. Spectrum efficiency can reflect the averaged channel condition among terminals of a particular TG. TGs may also be weighted based on their priority across the groups, where $w_{TG}(i)$ can denote the priority weight of TG(i).

Because the terminals in a TG may experience different channel conditions, evaluating the average spectrum efficiency in terms of modulation and coding can be time consuming. Accordingly, the most conservative case in converting throughput (in kbps) slot usage can be assumed for purposes of calculating spectral efficiency. That is, for TG(i) at any period t, the maximum and minimum throughput rate in slots/period can be given as $$R_{TG,max}^{slot}(i, t) = \text{ceil}\left[\frac{R_{TG,max}^{vol}(i, t) \cdot 8}{(m^* r^*) \cdot s_0}\right],$$

$$R_{TG,min}^{slot}(i, t) = \text{ceil}\left[\frac{R_{TG,min}^{vol}(i, t) \cdot 8}{(m^* r^*) \cdot s_0}\right],$$

where $R_{TG, max}^{vol}(i,t)$ and $R_{TG, min}^{vol}(i,t)$ are in bytes/period, $m^* r^*$ is the product representing the most robust modulation and coding. For QPSK 1/2, $m^*$=2, $r^*$=1/2. It should be noted that $m^*$ and $r^*$ are both configurable so that they can be adjusted based on operational practices. $R_{TG, min}^{slot}(i,t)$ and $R_{TG, max}^{slot}(i,t)$ can be used for deriving targeted slot allocation for the IGMs.

It is possible that the resultant short term throughput of a TG exceeds its maximum throughput rate. Alternatively, a resultant short term throughput may not meet the minimum subscribed throughput rate. Therefore, slot allocation in accordance with various embodiments can function in the range between a TG's minimum and maximum throughput rates as will be described in greater detail below.

In deriving the targeted slot allocation, both single IGM and multiple IGM scenarios are considered/contemplated in accordance with various embodiments, where slot allocation for a single IGM can be extended to multiple IGMs.

The expressions $R_{TG(i, j)}^{TAR,slot}(t)$ (in slots/period) and $R_{TG(i, j)}^{TAR,vol}(t)$ (in bytes/period) can denote the targeted slot allocation and the resultant throughput, respectively, of TG(i) at IGM(j), i=1, . . . , N, j=1, . . . , M. Expressions $D_{TG(i, j)}^{vol}(t)$ (in bytes) and $D_{TG(i, j)}^{slot}(t)$ (in slots) can represent the aggregate demand request and the resultant demand on slots of TG(i) (all terminals of TG(i)) at IGM(j) sampled at time t (where it should be noted that the demand may arrive at some time earlier than t).

Referring back to FIG. 4, one IGM may manage several IGs, where an IG can contain multiple inroutes with the same symbol rate. Accordingly, the IGM may run load balancing algorithms across inroutes inside an IG or across IGs. Thus, it can be assumed that the terminals of TGs will have a reasonably even distribution across inroutes and IGs. This enables the use of one parameter at the IGM level to manage the total throughput of a TG's terminals across different IGs.

The expression $D_{TG(i,j)}^{vol}(k, t)$ (unit: bytes) can denote the demand request at time t from terminal k of TG(i) in IGM(j), k=1, . . . , K. K is the number of terminals of TG(i) in IGM(j). For multiple IGs managed by one IGM, K can represent terminals in multiple IGs.

The demand (where the modulation and code rate are assumed to be persistent during the updating period) converted to the unit of slots would be:

$$D_{TG(i,j)}^{slot}(k, t) = \text{ceil}\left[\frac{D_{TG(i,j)}^{vol}(k, t) \cdot 8}{(m_k r_k) \cdot s_0}\right].$$

The demand (in bytes) for terminal k may arrive at the IGM in vector format representing three traffic classes: interactive, streaming and bulk. The demand vector may be converted into slots in vector format by the IGM. If this is the case, the total demand in slots simply sums up the elements in the vector. It should be noted that the demand collected for TG can include the satellite round trip time. Accordingly, the total demand in slots of TG(i) in IGM(j) is actually the summation of every terminal's demand of TG(i) in all IGs of IGM(j), given by following in units of slots:

$$D_{TG(i,j)}^{slot}(t) = \sum_{k=1}^{K} D_{TG(i,j)}^{slot}(k, t).$$

The total demand in bytes can be readily obtained by the following:

$$D_{TG(i,j)}^{vol}(t) = \sum_{k=1}^{K} D_{TG(i,j)}^{vol}(k, t).$$

Thus, the IGM reports the total demand in slots (or in both slots and bytes) of a TG in the IGM itself to the Bandwidth Manager.

A TG's maximum throughput may be specified for each IGM. Given that one IGM could cover one beam or a plurality of beams, there can be different approaches to addressing bandwidth management because different beams may have different terminal distribution.

The expression $w_{TG}(i)$ can be used to denote the priority weight of TG(i), and $C_{IGM}^{(slot)}(t)$ can denote the total available slots for IGM in the corresponding beam. The targeted overall slot allocation for TG(i) at time t based on the minimum and maximum subscribed throughput, as well as TGs' priority weights, can be calculated as follows:

$$R_{TG}^{TAR,slot}(i,t) = \min\{R_{TG,max}^{slot}(i,t), \max[X(i), W_{Tar}(i) \cdot C_{IGM}^{(slot)}(t)]\}.$$

Here, $W_{Tar}(i)$ is the weight coefficient of desired target for TG(i), and $C_{IGM}^{(slot)}(t)$ is the total available slots (including those for CBR) of the corresponding IGM at time t. $R_{TG,max}^{vol}(i)$ and $R_{TG,min}^{vol}(i)$ are the maximum and minimum throughput for TG(i), respectively. X(i) reflects the minimum throughput requirement, although it should be noted that the summation of X(i) may not exceed $C_{IGM}^{(slot)}(t)$. The following expression is the result $$X(i) = \min\left[R_{TG,min}^{slot}(i), \frac{R_{TG,min}^{vol}(i,t)}{\sum_{k=1}^{N}[R_{TG,min}^{vol}(k,t)]} \cdot C_{IGM}^{(slot)}(t)\right].$$

$W_{Tar}(i)$ can be obtained based on TGs' weights and the maximum throughput, subject to the design preference.

$$W_{Tar}(i) = a \cdot \frac{w_{TG}(i) \cdot R_{TG,max}^{vol}(i,t)}{\sum_{k=1}^{N}[w_{TG}(k) \cdot R_{TG,max}^{vol}(k,t)]} + (1-a) \cdot \frac{w_{TG}(i)}{\sum_{k=1}^{N}[w_{TG}(k)]}.$$

Coefficient "a" is a configuration variable taking values in between [0, 1]. When a=0, only the TGs' weights count; when a=1, both TGs' weights and throughput limits count. Fuzzy target setting is possible when configuring "a" between 0 and 1. For example, when a=0, the target setting is proportional to a TG's weight. When a=1, and all weights are equal, the target setting is proportional to the subscribed throughput limit. In accordance with one embodiment, the default value may be a=0.

It is possible that the summation of TGs' targets is smaller than $C_{IGM}^{(slot)}(t)$, where the residual slots can be $$C_{IGM}^{(slot)}(t) - \sum_{i=1}^{N} R_{TG}^{TAR,slot}(i,t).$$

If the residual slots exist, they can be distributed to TGs based on their weights from high to low using a round robin assignment order and small granularity (e.g., one or two slots per round) until a TG's maximum rate is reached or there are no residual slots left.

It is also possible that the summation of TGs' targets is larger than $C_{IGM}^{(slot)}(t)$, where the over-allotment slots can be expressed as $$\sum_{i=1}^{N} R_{TG}^{TAR,slot}(i,t) - C_{IGM}^{(slot)}(t).$$

If over-allotment slots exist, they can be taken away from TGs' targets based on weighted or regular round robin assignment using small granularity until a TG's minimum rate is reached or there is no over-allotment.

Such slot allocation is proportionally fair in terms of radio resources if the average spectrum efficiency is the same for all TGs. When the average channel conditions are different, such allocation favors those with better average channels as the resultant actual throughput is larger for a TG with better channel condition when a TG's maximum subscribed throughput rate cannot be met. The target is super frame (update period) based, where credit is not accumulated for a TG if the target throughput is not reached.

When the network is congested, the above equation applies, but when some TGs are not crowded, other TGs may be allowed to "break" their target throughput as will be discussed in greater detail below.

The expression $D_{TG(i)}^{slot}(t)$ (also denoted as $D_{TG}^{slot}(i,t)$) can be the demand (unserved backlog) and $R_{TG}^{TAR,slot}(i,t)$ can represent the targeted throughput in a slot for TG(i) in the beam. $A_{TG}^{slot}(t)$ can be the actual throughput (in slot/period), where $A_{TG}^{slot}(i,t)$ is calculated separately. $Z_{TG}^{slot}(t)$ (also referred to as $Z_i$) can be the residual capacity, which is calculated by $$Z_{TG}^{slot}(i,t) = \min[R_{TG}^{TAR,slot}(i,t) - A_{TG}^{slot}(i,t), R_{TG}^{TAR,slot}(i,t) - D_{TG}^{slot}(i,t)].$$

Here the current demand, $D_{TG}^{slot}(i,t)$, is counted to determine whether there is residual capacity for a TG. The residual capacity of TGs that have zero or small demand can be used for those that have a larger traffic load.

For those $Z_{TG}^{slot}(i,t) > 0$ (i.e., $Z_i > 0$), denote $I^{Z+} = \{i, Z_i > 0\}$, i.e., the surplus TG set, meaning the TGs' throughput is less than the respective target. Counting the demand, for TGs in $I^{Z+}$, the following is calculated:

$$\Delta C_i = R_{TG}^{TAR,slot}(i,t) - A_{TG}^{slot}(i,t) - A_{TG}^{slot}(i,t) - D_{TG}^{slot}(i,t).$$

The expression $I^{Z-} = \{i, Z_i < 0\}$, i.e., the deficit TG set, suggests that the TGs' throughput or demand is higher than the respective target, referred to as TGs of over-assignment. A TG's deficit ($\Delta D_i > 0$, $i \in I^{Z-}$) can be calculated by $$\Delta D_i = \max[A_{TG}^{slot}(i,t) - R_{TG}^{TAR,slot}(i,t), D_{TG}^{slot}(i,t) - R_{TG}^{TAR,slot}(i,t)].$$

$$Z_+ = \sum_{i \in \{\Delta C_i > 0\}} (\Delta C_i)$$

can be the residual capacity (credit), and $$Z_- = \sum_{i \in \{\Delta D_i > 0\}} (\Delta D_i).$$

TGs can be allowed, in the deficit set, to keep using some or all of the over-assigned bandwidth, or to meet the existing demand, if there is residual capacity. When $Z_+ \geq Z_-$, each TG in $Z_-$ will have $\Delta D_i$ added on top of its target. When $Z_+ < Z_-$, the residual capacity based on the method of either weighed or simple round robin can be assigned.

Regarding the weighted round robin method, assignment of the residual credit ($Z_+$) to the over-assigned set is based on a weighted round robin method until all the residual credit is used out. The weighted round robin is given as follows:

$$\varphi_i = \frac{w_{TG}(i) \cdot R^{vol}_{TG,max}(i)}{\sum_{k=1}^{N} [w_{TG}(k) \cdot R^{vol}_{TG,max}(k)]},$$

where $\varphi_i$ is TG(i)'s re-configured weight for round-robin, N is the number of TGs. $R_{TG,\ max}^{vol}(i)$ is the maximum throughput rate, and $w_{TG}(i)$ is the group weight for TG(i). Whenever a priority demand is fulfilled, it is taken out from the weighted round-robin and $\varphi_i$ be updated.

Alternatively, a simple round-robin may be used for assigning the residual credit to those in the deficit set, until either the demand is fulfilled or the residual capacity is used up. The expression $\Delta Z_i^+$ can denote the extra credit for the over-assigned (deficit) TGs. As a result, for terminal groups in $I^{Z-}=\{i, Z_i<0\}$, there will be $\Delta Z_i^+$ added on top of the original target allocation, i.e., the adjusted target of TG(i) in $I^{Z-}$ is given by $$R_{TG,\ ADJ}^{TAR,slot}(i,t) = R_{TG}^{TAR,slot}(i,t) + \Delta Z_i^+.$$

When $Z_+ \geq Z_-$, $\Delta Z_i^+ = \Delta D_i$. For those in $I^{Z+}=\{i, Z_i \geq 0\}$, the adjusted target would be intact, i.e., $$R_{TG,\ ADJ}^{TAR,slot}(i,t) = R_{TG}^{TAR,slot}(i,t).$$

For notational purposes, the adjusted target for TG(i) in IGM(j) is $$R_{ADJ,\ TG(i,j)}^{TAR,slot}(t) = R_{TG,\ ADJ}^{TAR,slot}(i,t).$$

Here, the TGs in the deficit set are allowed to use the residual capacity from those in the surplus set.

To address slot allocation for multiple IGMS, again, one beam is assumed to be covered by multiple IGMs. Since a single IGM may cover an individually different beam, it is understood that the approach can be extended to multiple beam scenarios.

The task of load balancing, which is referred to as balancing the load by moving terminals, is done across the inroutes and the IGs. Each IGM may have the same portion of a TG, i.e., an even distribution of TGs across IGMs, and therefore, the method of slot allocation for a single IGM can be readily adapted for slot allocation in a multiple IGM scenario, where the total estimated throughput calculation can be performed by aggregating all IGMs, rather than considering merely a single IGM.

However, there can be times when terminals of a TG may show up more in one IGM than the other. Slot allocation target purely based on the weighted throughput limit may fail in capturing the dynamics if terminal distribution is biased. To account for the short term unbalanced terminal distribution among TGs over IGMs, a weighing factor can be introduced to reflect such dynamics in the terminal's distribution.

The number of terminals in an IGM can assist with improving the slot allocation target, where $K_{ij}$ can be the number of terminals of TG(i) in IGM(j). To be effectively counted, a terminal must have a non-zero reported backlog.

H can be the number of terminal rate plans in a TG. Denote $r_h$, $h=1, \ldots, H$, the rate plan of a terminal. $K_{ij}^{(h)}$ is the number of terminals with rate plan h, $$K_{ij} = \sum_{h=1}^{H} K_{ij}^{(h)}.$$

The variable $v_{ij}$ can be used to denote the weighing factor on the number of terminals of TG(i) in IGM(j), where $v_{min}$ and $v_{max}$ are the lower and upper bounds for $v_{ij}$, respectively.

For IGM(j), $j=1, \ldots, M$. the weighing factor for TG(i) is expressed as $$v_{ij} = \min\left\{v_{max}, \max\left[v_{min}, \frac{\sum_{h=1}^{H}(K_{ij}^{(h)} \cdot r_h)}{\sum_{i=1}^{N}\sum_{h=1}^{H}(K_{ij}^{(h)} \cdot r_h)}\right]\right\}.$$

The default values are set as $v_{min}=0.2$, $v_{max}=1.0$.

Further, overall weight for TG(i) in IGM(j) can be consolidated by counting a TG's throughput limit, weight of TG, and weighing factor on a terminal's distribution, which can be expressed as $$W_{ij} = a \cdot \frac{w_{TG}(i) \cdot v_{ij} \cdot R^{vol}_{TG,max}(i,t)}{\sum_{k=1}^{N}[w_{TG}(k) \cdot v_{kj} \cdot R^{vol}_{TG,max}(k,t)]} + (1-a) \cdot \frac{w_{TG}(i) \cdot v_{ij}}{\sum_{k=1}^{N}[w_{TG}(k) \cdot v_{kj}]}.$$

As defined in the single IGM case, coefficient "a" is a configuration variable taking values in between [0, 1]. The default value is a=0.

Applying the overall weight to the minimum throughput limit (not to the maximum limit), the targeted slot allocation for TG(i) in IGM(j), $R_{TG}^{TAR,slot}(t)$, is given by $$R_{TG(i,j)}^{TAR,slot}(t) = \min\{R_{TG,max}^{slot}(i,t), \max[W_{ij} \cdot X(i,j), W_{ij} \cdot C_{IGM(j)}^{(slot)}(t)]\}.$$

X(i, j) reflects the TG(i)'s minimum throughput in IGM (j). Similar to that of single IGM, the summation of all $R_{TG,\ min}^{slot}(i)$, $i=1, \ldots, N$ over TGs cannot exceed $C_{IGM(j)}^{(slot)}(t)$. The result is the following:

$$X(i,j) = \min\left[R_{TG,min}^{slot}(i), \frac{R^{vol}_{TG,min}(i,t)}{\sum_{k=1}^{N}[R^{vol}_{TG,min}(k,t)]} \cdot C_{IGM(j)}^{(slot)}(t)\right].$$

When setting $v_{min}=v_{max}=1.0$, the slot allocation target for multi-IGM is essentially the same as that for a single IGM with an adjusted minimum throughput limit.

Again, as in the single IGM case, it is possible that the summation of TGs' targets in IGM(j) is smaller than the available slots in this IGM, $C_{TG(j)}^{(slot)}(t)$. Thus, the residual slots of IGM(j) can be $$C_{IGM(j)}^{(slot)}(t) - \sum_{i=1}^{N} R_{TG(i,j)}^{TAR,slot}(t).$$

If the residual slots exist, they can be distributed to TGs based on their weights from high to low using the round robin method and small granularity (e.g., one or two slots per round) until a TG's maximum rate is reached or there are no residual slots that remain. It should be noted that this operation is performed on a per IGM basis.

It is also possible that the summation of TGs' targets in IGM(j) is larger than the available slots in this IGM, $C_{IGM(j)}^{(slot)}(t)$. The residual slots of IGM(j) be defined as $$\sum_{i=1}^{N} R_{TG(i,j)}^{TAR,slot}(t) - C_{IGM(j)}^{(slot)}(t).$$

If the over-allotment slots exist, they should be taken away from TGs' targets based on weighted or standard round robin using small granularity until a TG's minimum rate is reached or there is no over allotment. This operation is also performed on a per IGM basis.

For multiple IGMs, the bandwidth manager utilizes additional input from the IGMs, $$\sum_{h=1}^{H} (K_{ij}^{(h)} \cdot r_h) \text{ of } IGM(j),$$

referred to as terminals' total plan rate, to calculate the targeted slot for TG(i) in IGM(j).

To calculate throughput, and considering that the slot allocation target of a TG in an IGM is available, IGM is configured to adaptively adjust its slot allocation at run-time such that the target can be met.

$A_{TG(i,j)}^{slot}(t)$ (in slots/period) and $A_{TG(i,j)}^{vol}(t)$ (in bytes/period) can be the actual aggregate slot assignment and the expected resultant volume of TG(i) in IGM(j), respectively, at time t. $A_{TG(i,j)}^{slot}(k, t)$ (in slots/period) and $A_{TG(i,j)}^{vol}(k, t)$ (in bytes/period) can be the actual aggregate slot assignment and the expected resultant volume/throughput for terminal k (k=1, ..., K) of TG(i) in IGM(j), respectively, at time t. K can be the number of terminals of TG(i) in IGM(j) at time t.

$A_{TG(i,j)}^{slot}(k, t)$ is the slot allocation for terminal k at time t. It can include both CBR (RT traffic) and non-CBR (NRT traffic) slots. The IGM can calculate the RT and NRT values by summing up the expected throughput based on the slot allocation in the period, where the period has multiple frames.

The slot allocation per terminal is known to the IGM. This can be expressed as $$A_{TG(i,j)}^{slot}(k,t) = A_{TG(i,j)}^{slot,NRT}(k,t) + A_{TG(i,j)}^{slot,RT}(k,t).$$

$A_{TG(i,j)}^{slot,RT}(k, t)$ is the CBR (RT) slot allocation for terminal k at period t (CBR slot allocation is per super frame).

$A_{TG(i,j)}^{slot,NRT}(k, t)$ is the slot allocation for NRT (the traffic classified as interactive, streaming and bulk, as well as adaptive CBR). It should be noted that traffic for adaptive CBR service may be classified in the interactive queue.

The expected resultant NRT throughput (in bytes/period), $A_{TG(i,j)}^{vol,NRT}(k, t)$, can be expressed as $$A_{TG(i,j)}^{vol,NRT}(k, t) = \frac{A_{TG(i,j)}^{slot,NRT}(k, t) \cdot (m_k r_k) \cdot s_0}{8}.$$

The expected resultant RT throughput (in bytes/period), $A_{TG(i,j)}^{vol,RT}(k, t)$, can be expressed as $$A_{TG(i,j)}^{vol,RT}(k, t) = \frac{A_{TG(i,j)}^{slot,RT}(k, t) \cdot (m_k r_k)^* \cdot s_0}{8}.$$

where $A_{TG(i,j)}^{slot,RT}(k, t)$ is the slot allocation for CBR-type traffic. It should be noted that the modulation and code rate, denoted by $(m_k r_k)^*$, is one level lower than it is supposed to be except for the most robust one.

The throughput of RT and NRT for TG(i) in IGM(j) by summing up over K users is given by $$A_{TG(i,j)}^{vol,RT}(t) = \sum_{k=1}^{K} A_{TG(i,j)}^{vol,RT}(k, t)$$

$$A_{TG(i,j)}^{vol,NRT}(t) = \sum_{k=1}^{K} A_{TG(i,j)}^{vol,NRT}(k, t).$$

The overall throughput, $A_{TG(i,j)}^{vol}(t)$, which can be calculated by ACU, is then given by $$A_{TG(i,j)}^{vol}(t) = (1-\eta_{NRT}) \cdot A_{TG(i,j)}^{vol,NRT}(t) + (1-\eta_{RT}) \cdot A_{TG(i,j)}^{vol,RT}(t).$$

$\eta_{NRT}$ and $\eta_{RT}$ are the estimated overhead percentage for NRT and RT. The overhead is the portion of bits in a burst that does not count as a payload.

The aggregate slot allocation (mixed, including NRT and RT) and expected throughput (mixed) for TG(i) in IGM(j) is given by $$A_{TG(i,j)}^{slot,NRT}(t) = \sum_{k=1}^{K} A_{TG(i,j)}^{slot,NRT}(k, t),$$

$$A_{TG(i,j)}^{slot,RT}(t) = \sum_{k=1}^{K} A_{TG(i,j)}^{slot,RT}(k, t),$$

$$A_{TG(i,j)}^{slot}(t) = A_{TG(i,j)}^{slot,RT}(t) + A_{TG(i,j)}^{slot,NRT}(t).$$

The overall expected throughput for TG(i) across all IGMs, denoted as $A_{TG(i)}^{vol}(t)$, is given (in bytes/period) by the following:

$$A_{TG(i)}^{vol}(t) = \sum_{j=1}^{M} A_{TG(i,j)}^{vol}(t). \text{ (for one } IGM \text{ per beam, } M = 1).$$

The estimated throughput and slot allocation may need to be smoothed to avoid unnecessary short term fluctuations. The smoothed average estimated throughput for TG(i) at time t by using exponential moving average (EMA) can be expressed as $$A_{TG(i)}^{EMA,vol}(t) = \alpha_1 \cdot A_{TG(i)}^{vol}(t) + (1-\alpha_1) \cdot A_{TG(i)}^{EMA,vol}(t-1),$$

where $\alpha_1$ is the smoothing factor with default value $\alpha_1 = 0.1$.

The long term (LT) average estimated throughput for TG(i) at time t can be expressed as $$A_{TG(i)}^{LT,vol}(t) = \alpha_{LT} \cdot A_{TG(i)}^{vol}(t) + (1-\alpha_{LT}) \cdot A_{TG(i)}^{LT,vol}(t-1).$$

where $\alpha_{LT}$ is the smoothing factor with default value $\alpha_{LT} = 0.01$. The long term throughput can be used for reporting and testing purposes.

Slot allocation at the IGM may require a short term response and thus a short term simple moving average (SMA) can be utilized. Thus, the average slot allocation for TG(i) in IGM(j) at time t can be expressed as SMA over past $N_0$ periods. The default value is $N_0 = 1$ or 3. For instant response, $N_0 = 1$.

$$A_{TG(i,j)}^{SMA,slot}(t) = \frac{\sum_{n=t-N_0+1}^{t} A_{TG(i,j)}^{slot}(n)}{N_0},$$

$$A_{TG(i,j)}^{SMA,slot,NRT}(t) = \frac{\sum_{n=t-N_0+1}^{t} A_{TG(i,j)}^{slot,NRT}(n)}{N_0}.$$

As alluded to above, various embodiments utilize a scaling factor that can be used to adjust the throughput of each terminal in a TG. The scaling factor will be applied in backlog-based and periodic bandwidth allocation to limit the maximum scheduled amount and to adjust the scheduling frequency. Subject to congestion, the scaling factor can be, e.g., increased or decreased, thereby resulting in the scaling up or down of a terminal's throughput, thus affecting the bandwidth allocation at the IGM.

The criteria for traffic flow control can be as follows. When the overall throughput (in bytes) of a TG is between the minimum and maximum subscribed rate, the scaling factor can be upwardly or downwardly adjusted, subject to the total slot allocation (RT+NRT) of the TG compared to the target throughput/allocation. When the overall throughput (in bytes) of a TG is higher than its maximum subscribed rate, the scaling factor is downwardly adjusted, regardless of the slot allocation target. When the overall throughput (in bytes) of a TG is lower than its minimum subscribed rate, the scaling factor is adjusted upward, regardless of the slot allocation target. When using the scaling factor for the terminal's rate plan and periodic bandwidth allocation, its range should be bounded.

In particular, $\delta_1$ can be defined as the relative tolerance associated with falling in between the minimum and maximum throughput range and $\Delta_1$ can be the respective relative adjustment. $\delta_2$ can be the relative tolerance of meeting the slot allocation target, and $\Delta_2$ can be the respective relative adjustment. The default values can be set as $\delta_1=0.08$, $\delta_2=0.03$, $\Delta_1=0.05$, and $\Delta_2=0.05$.

A scaling factor $F_{ij}$ can be defined ($F_{min} \leq F_{ij} \leq F_{max}$) for TG(i) in IGM(j), $i=1, \ldots, N$, $j=1, \ldots, M$. By default, $F_{min}=0.25$ and $F_{max}=2.0$, although other default settings can be used. Furthermore, $G_{ij}$ can be defined ($G_{min} \leq G_{ij} \leq G_{max}$), which will be applied to the rate plan, and $F_{ij}^{(P)}$ can be defined ($F_{min}^{(P)} \leq F_{ij}^{(P)} \leq F_{max}^{(P)}$) which can be applied to the periodic bandwidth allocation. The default values are $G_{min}=0.50$, $G_{max}=1.0$, $F_{min}^{(P)}=0.80$, and $F_{max}^{(P)}=1.0$, but again, can vary.

Accordingly, the following traffic control scheme (disclosed as pseudo code) can be executed by the Bandwidth Manager.

The bandwidth manager may then output these scaling factors to the respective IGMs.

Figure 7:
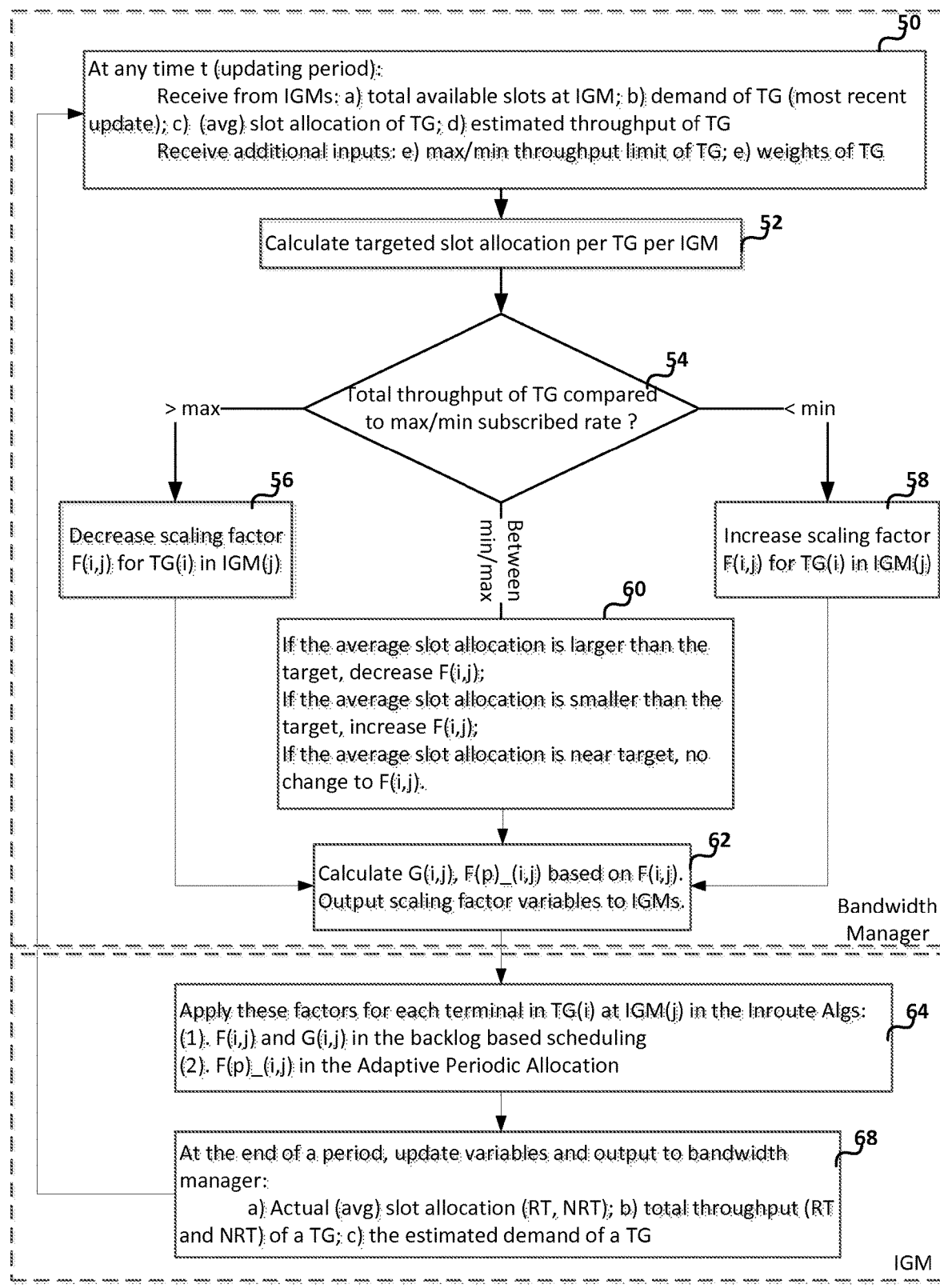
FIG. 7 is an operational flow chart illustrating the processes and interactions between an inroute group manager and a bandwidth manager for managing bandwidth in accordance with various embodiments.

Application of the scaling factors (output by the bandwidth manager) at the IGMs is as follows. The scaling factor $F_{ij}(t)$ will be multiplied with the terminal's rate plan when calculating the sorting ratio. As will be described in greater detail below, the sorting ratio can be used to assign bandwidth to TG with the smallest ratio at every period or some multiple of periods in accordance with a "greedy filling" scheme. The scaling factor $G_{ij}(t)$ will be multiplied with the terminal's rate plan when calculating the maximum scheduling amount in the token bucket scheme (which can be utilized to check that data packet transmissions conform to defined bandwidth limitations and burstiness. The scaling factor $F_{ij}^{(P)}(t)$ will be multiplied with the maximum periodic rate allocation. These factors applied to TG(i) in IGM(j) will scale up and down, the allocated slots of a terminal, and thus ultimately the resulting overall throughput of the TG as illustrated in FIG. 7.

One example of inroute bandwidth allocation is described in U.S. Patent Publication No. 2013/0136004. In accordance with various embodiments, such inroute bandwidth allocation can be adapted/improved through the use of the aforementioned scaling factors. That is, a TG's weight and scaling factors $F_{ij}(t)$ and $G_{ij}(t)$ can be applied to backlog based scheduling.

As previously described, QoS and throughput requirements of each TG can be fairly satisfied (e.g., allocation of bandwidth to a TG is proportional relative to its maximum throughput rate/pre-assigned weighting). To accomplish such proportionally fair scheduling, the following algorithm can be applied. The service plan for the k-th user can be $A_k$ and the base plan can be $A_0$ in slots per frame, $i=1, 2, \ldots$. The throughput vector can be $S(t)=[S_1(t), S_2(t), \ldots, S_K(t)]$, where K is the number of terminals. Referring back to FIG. 6, t is the time tick for frames.

As to calculating a sorting ratio, when modulation and coding is considered, the normalized value can be used in calculating the throughput ratio. MC(j) can be used to denote the modulation and coding scheme j, and MC(0) can refer to the most robust modulation scheme. The information rate based on MC(0) can be the smallest among that of M(i)'s. Here, i and j represent the modulation and coding index.

The MC(i) coefficient $$\beta_i = \frac{MC(i)}{MC(0)} = \frac{m_i r_i}{m_0 r_0} \cdot m_i$$

is determined by modulation ($m_i=2, 3, 4$, etc. for QPSK, 8-APSK, 16-APSK, and so on) and $r_i$ can be the code rate. Additionally, i is the index of the modulation and coding scheme.

---

For TG(i), i=1,...,N, at time t, update the scaling factor for TG(i) at IGM(j), i=1,...,N, j=1,...,M.
If $A_{TG(i)}^{EMA,vol}(t) > R_{TG, max}^{vol}(i) \cdot (1 + \delta_1)$ %including RT and NRT
    $F_{ij}(t) = \max[F_{min}, (1 - \Delta_1) \cdot F_{ij}(t-1)]$ ;
Else if $A_{TG(i)}^{EMA,vol}(t) < R_{TG, min}^{vol}(i) \cdot (1 + \delta_1)$
    $F_{ij}(t) = \min[F_{max}, (1 + \Delta_1) \cdot F_{ij}(t-1)]$;
Else %throughput $A_{TG(i)}^{vol}(t)$ falling in between minimum and maximum rate
    %for IGM(j), j=1,...,M
    if $A_{TG(i,j)}^{SMA,slot}(t) > R_{ADJ, TG(i,j)}^{TAR,slot}(t) \cdot (1 + \delta_2)$ , $F_{ij}(t) = \max[F_{min}, (1 - \Delta_2) \cdot F_{ij}(t-1)]$ ;
    if $A_{TG(i,j)}^{SMA,slot}(t) < R_{ADJ, TG(i,j)}^{TAR,slot}(t) \cdot (1 - \delta_2)$ , $F_{ij}(t) = \min[F_{max}, (1 + \Delta_2) \cdot F_{ij}(t-1)]$ ;
    if $R_{ADJ, TG(i,j)}^{TAR,slot}(t) \cdot (1 - \delta_2) \leq A_{TG(i,j)}^{SMA,slot}(t) \leq R_{ADJ, TG(i,j)}^{TAR,slot}(t) \cdot (1 + \delta_2)$ , $F_{ij}(t) = F_{ij}(t-1)$ .
End
% assign values to $G_{ij}$ and $F_{ij}^{(P)}$
$G_{ij}(t) = \min[\max(G_{min}, F_{ij}), G_{max}]$
$F_{ij}^{(P)}(t) = \min[\max(F_{min}^{(P)}, F_{ij}), F_{max}^{(P)}]$ .

Additionally, for a k-th terminal at an inroute that belongs to TG(i) in IGM(j), the scaling factor $F_{ij}(t)$, is multiplied by the rate plan, i.e., $F_{ij}(t)A_k$. This is done to scale down (or up) the maximum rate for a terminal to fit the maximum throughput of the TG that the terminal belongs to.

Thus, the sorting ratio can be defined as $$ratio_k(t) = \frac{S_k(t)}{g_k \beta_k(t) F_{ij}(t) A_k}, k = 1, \ldots, K.$$

K is the number of terminals with an inroute. $g_k$ is a factor intended to satisfy certain priority or weight, where the default value is $g_k=1$ in accordance with one embodiment. A group weight, $w_{TG}(i)$ can be assigned to a terminal, i.e., $g_k = w_{TG}(i)$ for the k-th terminal that belongs to TG(i). However, since the group weight is already applied when partitioning the slots among TGs (as described above), it is not necessary to apply the group weight again.

A scheduler sorts the ratio, $ratio_k(t)$, at every frame, and assigns the slots (of this frame) to the k-th terminal with the smallest ratio up to its maximum rate at time t. The maximum rate at time t is dynamically updated by $F_{ij}(t)A_k$ (the original being $A_k$). If there is any amount of the resource left, the slots can then assigned to the terminal with second smallest ratio. Greedy filling is continued if necessary. Once the slots are assigned, the scheduler updates the abovementioned average throughput formula.

In terms of throughput limitations, the subscription plan rate can be denoted in terms of Megabits per second and is equivalent to $R_{max}(n)$ slots/frame for a user plan n, n=1, 2, 3 . . . (or A, B, C . . . ), i.e., plans A, B, C, . . . . The user/terminal's subscription rate plan can be the throughput limit as it specifies the maximum scheduled transmittable data amount per frame. For a TG's throughput limit, $G_{ij}(t)$ can be applied to $R_{max}(n)$ in order to obtain the throughput limit $G_{ij}(t) \cdot R_{max}(n)$. The throughput limitation can be managed in every frame or every few frames (e.g., a super frame). In backlog based scheduling, the limit is imposed in each frame. The limiting period is set as M frames with default value of M=4.

For example, group rate plans can be 2 Mbps for two TGs, e.g., TG 1 and TG 2. If group weighting is equal, i.e., W_TG(1)=W_TG(2)=1, assuming the same modulation and coding for all terminals where one terminal is with TG 1 and two terminals are with TG 2, the terminals' rate plans are the same, i.e., 2 Mbps. All three terminals can be assigned to one inroute with a 2 Mbps capacity in IGM I.

The initial values of the scaling factor are as follows: F_11=1 and F_21=1. If there is no bandwidth management among TGs, the three terminals will get an average ⅔ Mbps each. If the bandwidth management among TGs is performed, the terminal under TG 1 would receive 1 Mbps and each terminal in TG 2 would receive 0.5 Mbps. The scaling factor will reach a ratio of F_11/F_21=2/1 at the equilibrium (although the exact value of scaling factors may vary subject to smoothing factors).

In accordance with another example, the conditions can the same as the previous example, except that the two terminals of TG 2 have different modulation/coding (e.g., the first TG 2 terminal first uses QPSK, 1/2, while the second TG 2 terminal uses QPSK, 9/10. The slot allocation between TG 1 and TG 2 would be 1:1. The scaling factor will likely reach a ratio of F_11/F_21=2/1. The throughput of the two terminals would have a ratio of 1:1.8 in terms of Mbps.

As to periodic rate allocation, an IGM may allocate bandwidth to terminals sharing one inroute in the format of M slots every N 45 ms frames based on the utilization. There may be a maximum limit on throughput rate, denoted as $\{M\_slots/N\_frames\}_{max}$. Multiplying $F_{ij}^{(P)}$ with $\{M\_slots/N\_frames\}_{max}$ limits the throughput per terminal, thus limiting the throughput of a TG.

FIG. 7 is an operational flow chart summarizing the above-described interactions and respective processes performed between the bandwidth manager and IGM for inroute bandwidth management in accordance with various embodiments. Within the bandwidth manager, at operation 50, the following inputs are received from each of a plurality of IGMs: a) total available slots at each IGM; b) demand (most recent demand request) of each TG served by each IGM; c) average slot allocation of each TG; d) estimated throughput of each TG. Still other inputs that are received at the bandwidth manager include: d) the maximum and minimum throughput limits of each TG; and e) the weights of each TG. At operation 52, the bandwidth manager calculates the targeted slot allocation on a per TG and per IGM basis. At operation 54, the bandwidth manager compares the total throughput of each TG to each TG's respective maximum and minimum subscribed rate/predetermined throughput limits. If the total TG throughput is greater than the maximum subscribed rate limit, the scaling factor F(i, j) for that TG in the applicable IGM is decreased at operation 56. If the total TG throughput is less than the minimum subscribed rate limit, the scaling factor Fly for that TG in the applicable IGM is increased at operation 58. If the total throughput of the TG is determined to be somewhere between the minimum and maximum subscription rate limits, the following processes can be performed as part of operation 60: if the average slot allocation is larger than the targeted slot allocation, $F_{ij}$ for that TG is decreased; if the if the average slot allocation is smaller than the targeted slot allocation, $F_{ij}$ for that TG is increased; and if the average slot allocation is near/around the targeted slot allocation, $F_{ij}$ for that TG is left unchanged (i.e., if $R_{ADJ,\ TG(i,\ j)}^{TAR,slot}(t) \cdot (1-\delta_2) \leq A_{TG(i,j)}^{SMA,slot}(t) \leq R_{ADJ,\ TG(i,j)}^{TAR,slot}(t) \cdot (1+\delta_2)$, $F_{ij} = F_{ij}(t-1)$). At operation 62, the bandwidth manager calculates the scaling factors $G_{i,j}$ and $F_{ij}^{(P)}$ based on $F_{i,j}$, and outputs these variables to the respective IGMs.

At the IGM, at operation 64, the scaling factor variables received from the bandwidth manager (at operation 62) are applied (for each terminal in the appropriate TG) in the inroute algorithms described above, i.e., $G_{i,j}$ and $F_{i,j}$ are applied to backlog based scheduling, while $F_{ij}^{(P)}$ applied to (adaptive) periodic bandwidth allocation (described above). At operation 68, the IGM updates the following variables and outputs them to the bandwidth manager (to effectuate the feedback control loop): a) actual average slot allocation for RT and NRT traffic; b) the total throughput (for both RT and NRT traffic) of each TG; and c) the estimated demand of each TG. Again, each IGM in the system can perform these operations in conjunction with the centralized bandwidth manager.

As described previously, dedicated inroutes and IGs were not included as part of the available capacity determination for IGMs because they are not available as a shared resource(s) for other TGs. That is, a dedicated IG is one that is reserved solely for use by one or more TGs designated as being able to utilize such dedicated inroutes/IGs. However, those TGs that are able to access dedicated resources may also use both its dedicated IGs and those IGs that are shared by other (non-designated TGs). This type of architecture can allow a designated TG to "fall back" on shared IGs due to a change in link or load condition. Additionally, an IGM can manage both dedicated and shared IGs.

Figure 8:
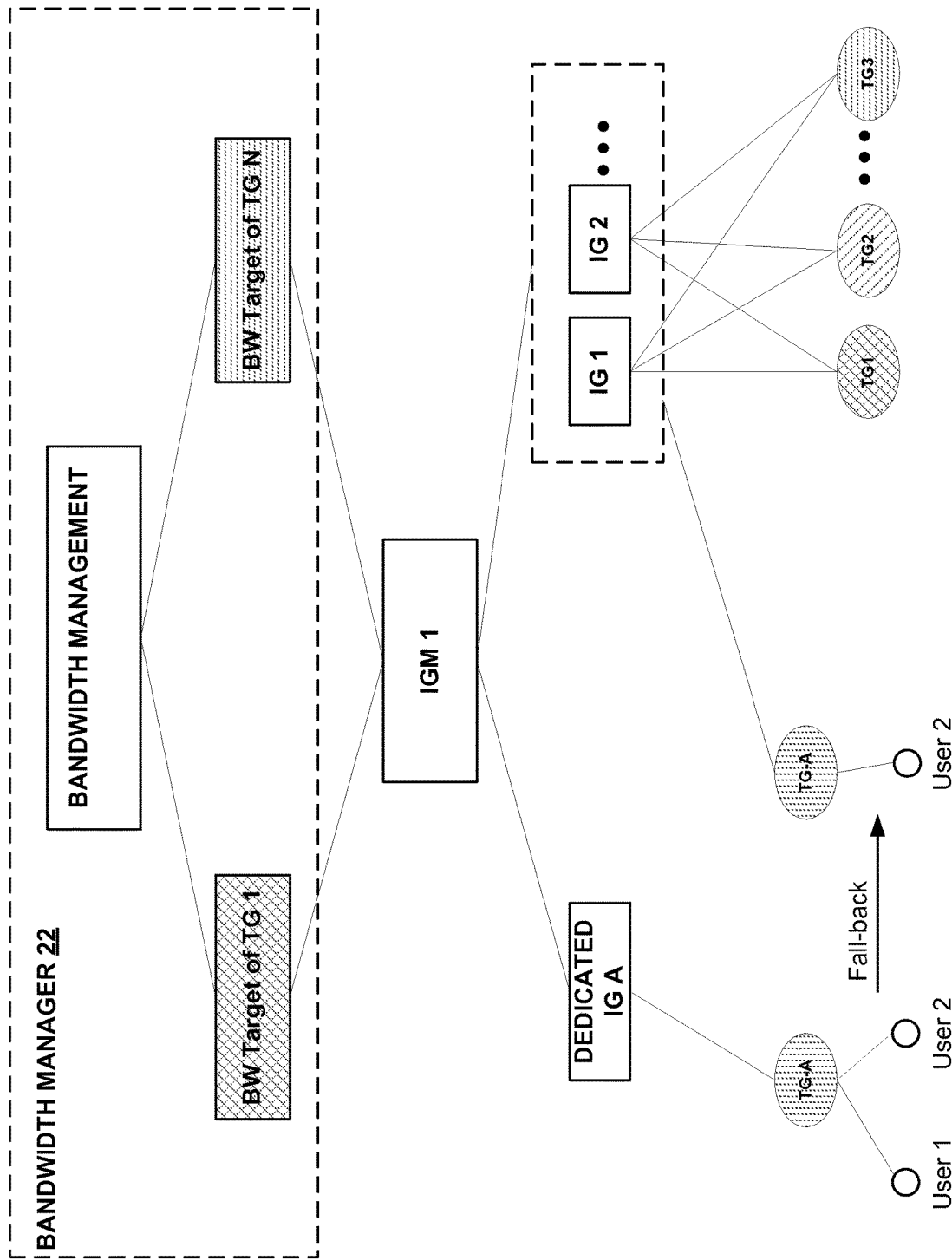
FIG. 8 is a diagrammatic representation of an example system structure in which various embodiments can be implemented for addressing dedicated inroute groups.

FIG. 8 an example system architecture illustrating a TG operating in dedicated and shared IGs. TG A is designated for dedicated IG(s), for example, Dedicated IG A having an inroute of 2 Msps. Both user 1 and user 2 are assigned to this IG A. However, if the channel conditions experienced by user 2 gets worse, user 2 can elect to use a 512 ksps inroute based on AIS (Adaptive Inroute Selection), where the IGs (IG 1 and IG 2) that have at least one inroute of 512 ksps is available from these "shared" IGs. Thus, TG A would use both dedicated IG(s) (Dedicated IG A) and shared IGs (IG 1 and IG 2).

It should be noted that TG A is designated to use a dedicated IG, i.e., Dedicated IG A. Some terminals of TG A can be assigned to the shared IGs, IG 1 and IG 2. A dedicated IG, such as Dedicated IG A, may be assigned to one or more designated TGs. Because the inroute resources are different for the dedicated and shared IGs, the bandwidth manager executes bandwidth management separately or in stages, one for the dedicated IG(s) and the other for the shared IGs. Accordingly, an IGM that supports both shared and dedicated IGs reports the bandwidth resource, backlog, and resultant throughput to the bandwidth manager for TGs in the dedicated and shared IGs separately.

In a case where a TG is operative in both dedicated and shared IGs, such as TG A. TG A can be allowed to utilize as much bandwidth as it can in the dedicated IG(s) up to its subscription rate plan limit, and then to use bandwidth in the shared IGs up to any residual bandwidth of its subscription rate plan. If the bandwidth usage in the dedicated IG already reaches the maximum throughput, a tolerance percentage of the maximum throughput would be allowed in the shared IGs.

In particular, $R_{TG,\ min}^{vol}(A)$ and $R_{TG,\ max}^{vol}(A)$ (in bytes/period) can refer to the minimum and maximum subscription throughputs, of TG A, respectively. Again, TG A is dedicated to use IG A. Additionally, TG A can use the shared IGs (IG 1 and IG 2) if its terminals fall back to lower symbol rates. Further, θ can be the tolerance if the usage of TG A in the dedicated IG reaches the limit. The default value can be θ=10.

Accordingly, the criteria for determining the inputs to the bandwidth manager are as follows. For the dedicated IG(s):
a) the maximum and minimum throughput of TG A as inputs to the bandwidth manager from the dedicated IG would be $R_{TG,\ max}^{vol}(A)$ and $R_{TG,\ min}^{vol}(A)$ respectively;
b) the demand would be the corresponding backlog recorded from the terminals of TG A inside the dedicated IG;
c) the throughput and slot usage of TG A in the dedicated IG, denoted as $A_{TG(A)}^{vol,\ dedicated}(t)$ and $A_{TG(A)}^{slot,\ dedicated}(t)$ respectively, are passed to the bandwidth manager by the IGM; and
d) a separate scaling factor, computed by the bandwidth manager, would also be used for TG A in the dedicated IG.

For the shared IGs, the criteria for determining the inputs to the bandwidth manager are as follows:
a) the maximum and minimum throughput of TG A as inputs to the bandwidth manager from the shared IGs, denoted as $R_{TG,\ max}^{vol,\ shared}(A)$ and $R_{TG,\ min}^{vol,\ shared}(A)$, respectively, would be $$R_{TG,\ min}^{vol,\ shared}(A)=\max[(R_{TG,\ min}^{vol}(A)-A_{TG(A)}^{vol,\ dedicated}(t)),\theta \cdot R_{TG,\ min}^{vol}(A)],\ \text{and}$$

$$R_{TG,\ max}^{vol,\ shared}(A)=\max[(R_{TG,\ max}^{vol}(A)-A_{TG(A)}^{vol,\ dedicated}(t)),\theta \cdot R_{TG,\ max}^{vol}(A)]$$

For less fluctuation, it may be preferable to use the exponential moving average (EMA) for the volume of dedicated TG, $A_{TG(A)}^{vol,\ dedicated}(t)$;
b) the demand would be the corresponding backlog recorded from terminals of TG A inside the shared IG;
c) the throughput and slot usage of TG A in the shared IGs, denoted as $A_{TG(A)}^{vol,shared}(t)$ and $A_{TG(A)}^{slot,shared}(t)$ respectively, are passed to the bandwidth manager by the IGM; and
d) a separate scaling factor, computed by the bandwidth manager, would also be used for TG A in the shared IGs.

Thus, the total throughput of TG(A) (in bytes/period or kbps) would be $$A_{TG(A)}^{vol,\ total}(t)=A_{TG(A)}^{vol,\ dedicated}(t)+A_{TG(A)}^{vol,\ shared}(t).$$

It should be noted that this total throughput need not be used for determining the scaling factors in the dedicated and shared IGs as the decision making is done separately for different IGs. Instead, it may be used for statistics or testing purposes.

Accordingly, when a dedicated IG is in use in an IGM, the algorithms used in performing bandwidth management as described previously are run separately for the dedicated and shared IGs. A TG designated for the dedicated IG may use both the dedicated and shared IGs. The total throughput of such a TG may count both types of IGs.

Still another aspect of bandwidth management that can be considered in various embodiments is the manner in which information throughput may be quantified. The bandwidth provided by a wireless/satellite channel may be measured by the carried information rate, referred to as Air Bits. Because compression techniques are used at the transmission and receiving ends, the actual information rate of user applications may be higher than the original information rate (after compression). Thus, the original information rate can be referred to as Router Bits. A TG's subscription rate may be measured in terms of Router Bits. When performing bandwidth allocation, a conversion from Router Bits to Air Bits may be needed.

Figure 9:
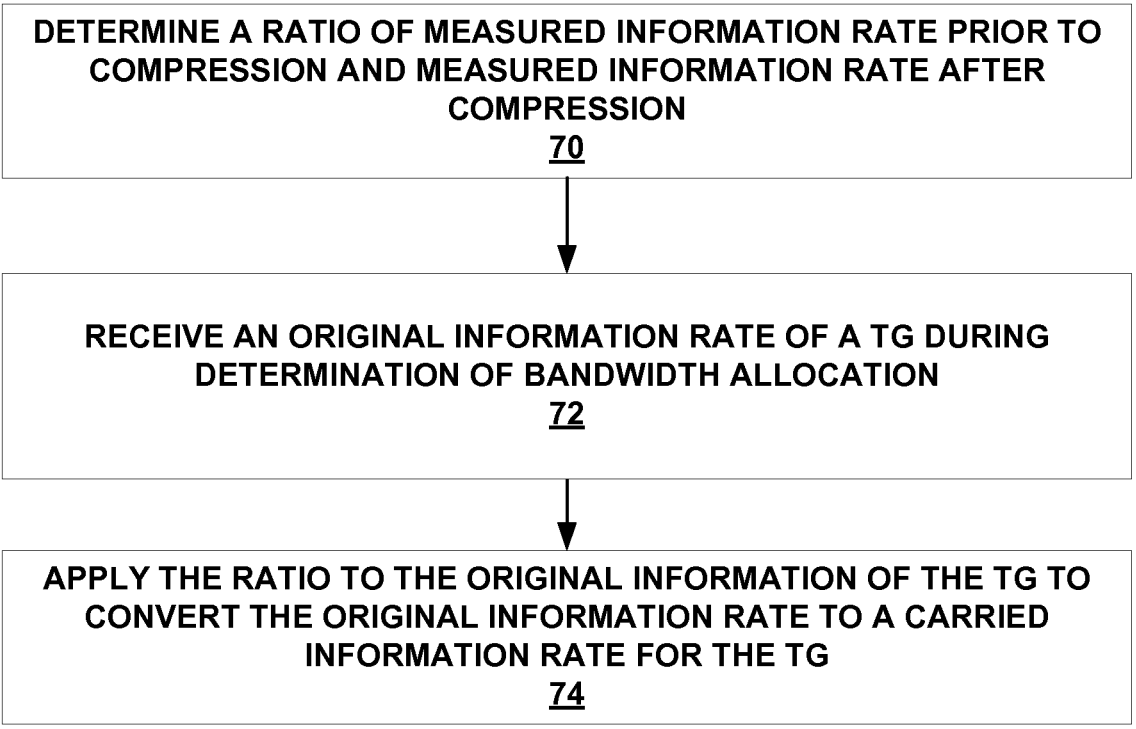
FIG. 9 is a flow chart illustrating example operations performed for converting information rates in accordance with various embodiments.

FIG. 9 is a flow chart illustrating example operations that can be executed to perform this information rate conversion in accordance with various embodiments. In particular, and at operation 70, a ratio between the information (per subscription) rate measured prior to application of any compression (i.e., in Router Bits) and the information rate measured after compression (i.e., in Air Bits) is determined. This ratio can be determined based on information rate measurements over a large variety of user applications. Such a ratio can be referred to as the Router Bits to Air Bits ratio (R-to-A ratio). At operation 72, an original information rate of a TG during determining bandwidth allocation is received. At operation 74, the ratio is applied to the original information rate of the TG to convert the original information rate to a carried information rate for the TG.

For example, the long term R-to-A ratio for a TG may be 1:0.8, where the TG's subscription is defined by the information rate relevant to applications, i.e., the Router Bits. Accordingly, and if the information rate in Router Bits is, e.g., 100 Mbps, the converted carried information rate (per the TG's subscription) in Air Bits would be 80 Mbps after application of the 1:0.8 R-to-A ratio.

For ease of description, Table 1 lists the variables that can be sent between the bandwidth manager and an IGM. Again, the same variables are sent for dedicated (if they exist) and shared IGs for one IGM.

TABLE 1

| Notation | Name | Unit | Sending Component | Comment |
|---|---|---|---|---|
| $D_{TG(i,j)}^{slot}(t)$ | Demand in slots for TG(i) in IGM(j) | slots (or slots/period) | IGM | Used for slot allocation |
| $D_{TG(i,j)}^{vol}(t)$ | Demand in bytes for TG(i) in IGM(j) | Bytes (or bytes/period) | IGM | May be used for stats only |
| $C_{IGM(j)}^{(slot)}(t)$ | Total available slots of IGM(j) at period t | slots/period | IGM | Including CBR |
| $A_{TG(i,j)}^{vol,RT}(t)$ | RT throughput of TG(i) in IGM(j) during time t | Bytes/period or kbps or both | IGM | For calculation, use bytes/period; for stats, use kbps. Can be used for CBR usage. |
| $A_{TG(i,j)}^{vol,NRT}(t)$ | NRT throughput of TG(i) in IGM(j) during time t | Bytes/period or kbps or both | IGM | $A_{TG(i,j)}^{vol}(t) = (1 - \eta_{NRT}) \cdot A_{TG(i,j)}^{vol,NRT}(t) + (1 - \eta_{RT}) \cdot A_{TG(i,j)}^{vol,RT}(t)$ Calculated at ACU |
| $A_{TG(i,j)}^{slot,RT}(t)$ | Number of RT slots used by TG(i) in IGM(j) during time t | Slots/period | IGM | Can be used for CBR usage |
| $A_{TG(i,j)}^{slot,NRT}(t)$ | Number of NRT slots used by TG(i) in IGM(j) during time t | Slots/period | IGM | $A_{TG(i,j)}^{slot}(t) = A_{TG(i,j)}^{slot,RT}(t) + A_{TG(i,j)}^{slot,NRT}(t)$ at BM (ACU) |
| $\sum_{h=1}^{H}\left(K_{ij}^{(h)} \cdot r_h\right)$ | Total rate of TG(i) in IGM(j) | Kbps or Mbps | IGM | For weighing factors for multiple IGMs |
| $F_{ij}(t)$ | Scaling factor F_ij | N/A | BM (ACU) | Control variable for scaling TG's throughput |
| $F_{ij}^{(P)}(t)$ | Scaling factor G_ij | N/A | BM (ACU) | Control variable for scaling TG's throughput |
| $G_{ij}(t)$ | Scaling factor F(p)_ij | N/A | BM (ACU) | Control variable for scaling TG's throughput |

Due the random distribution of terminals of a TG over one or more inroutes, IGs, and beams, direct control of the throughput by managing inroute slot allocation can be problematic. Accordingly, the various embodiments described herein provide systems and methods that allow for indirect control of throughput in TGs by dynamically calculating throughput of a given terminal as a function of its TG, the policies for the TG (which can be met, over time, for a TG across multiple independent aggregation points), and the state of the demand versus available resources. In particular, slot allocation targets for a TG can be calculated based on minimum and maximum throughput requirements, demand, and actual slot usage. Actual throughput is compared with the target throughput. Moreover, a feedback control loop is provided to manage and track changes to the calculated throughput, i.e., through the use of scaling factors that can be dynamically applied to adjust a terminal's throughput, and thus ultimately affect a TG's throughput. By adjusting the scaling factors, the actual throughput of a TG can be managed to meet its respective target throughput, achieving the goal of bandwidth management for TGs.

Further still, implementation of various embodiments, e.g., the bandwidth manager, and communications between IGMs and the bandwidth manager, can be simply accomplished. Accordingly, various embodiments have the ability to run in distributed processors that may have limited processing, memory, and real-time requirements when allocating bandwidth for users in a sub-net. Additionally, bandwidth utilization efficiency is readily achieved due to the ability to best use a shared resource without wasting remaining bandwidth to unnecessarily reserving bandwidth or underutilizing capacity while making an admission/allocation decision. Yet another advantage realized by the implementation of various embodiments addresses errors in policy application. That is, various embodiments have the ability to meet a required TG policy without incurring large errors due to delays in reaction time to changing conditions of demand and system resource usage.

Various embodiments described herein are directed to systems and methods of bandwidth allocation among TGs with proportional fairness in terms of both throughput and spectrum usage across a network, e.g., in accordance with a subscription plan, pre-assigned weighting, and/or time-varying aggregate spectrum efficiency, where users can be spread over a large geographical area (and served by multiple satellite beams). Not only are QoS metrics for TGs satisfied in terms of maximum throughput and spectrum utilization, but QoS metrics such as latency, throughput, and prioritized traffic services for individual terminals are also provided. Further still, various embodiments are able to operate seamlessly with existing satellite bandwidth allocation schemes and/or mechanisms for individual terminals, as well as network congestion control algorithm and protocols.

Figure 10:
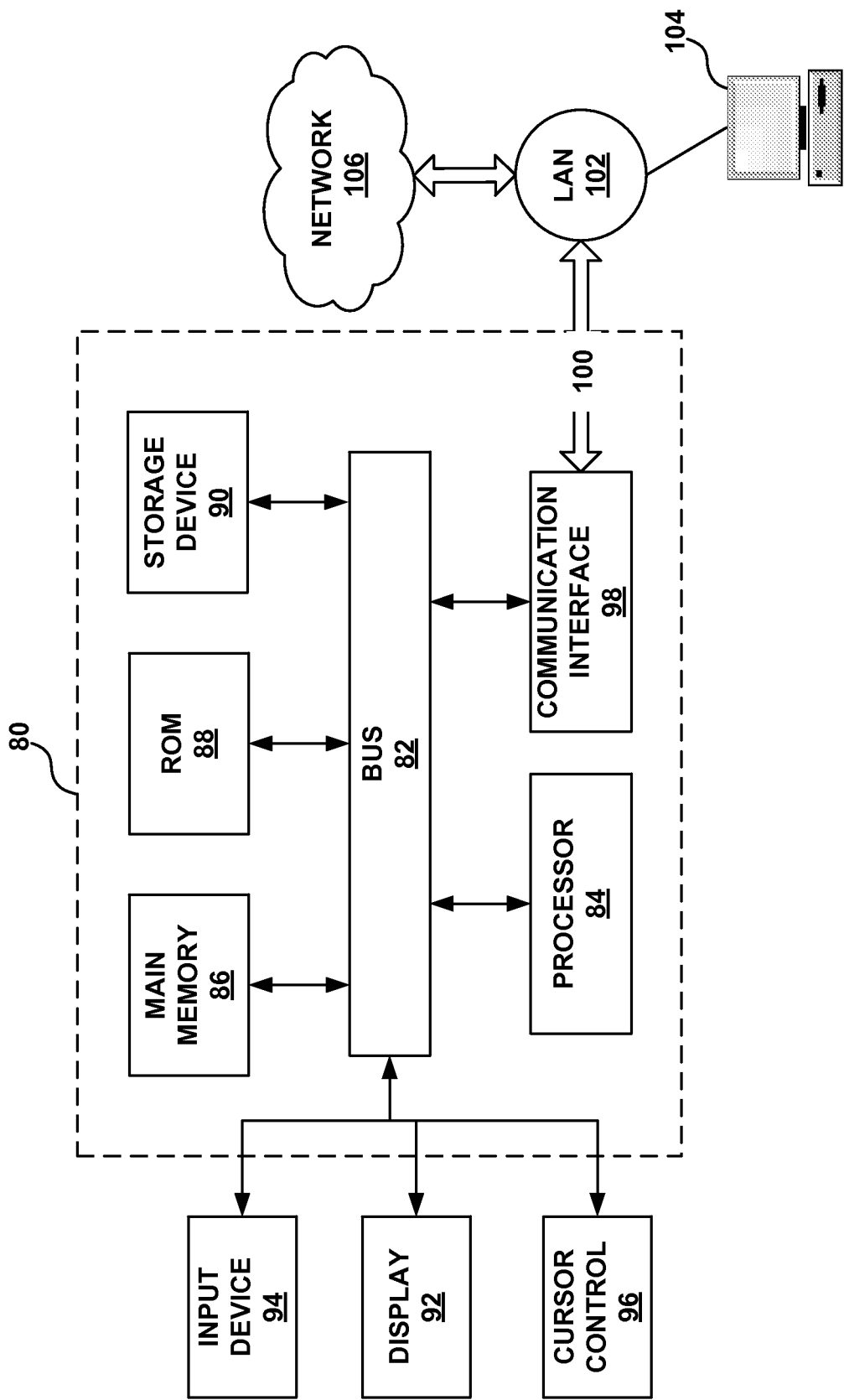
FIG. 10 illustrates an example computing module that may be used in implementing features of various embodiments.

FIG. 10 illustrates a computer system 80 upon which example embodiments according to the present invention can be implemented. Computer system 80 can include a bus 82 or other communication mechanism for communicating information, and a processor 84 coupled to bus 82 for processing information. Computer system 80 may also include main memory 86, such as a random access memory (RAM) or other dynamic storage device, coupled to bus 82 for storing information and instructions to be executed by processor 84. Main memory 86 can also be used for storing temporary variables or other intermediate information during execution of instructions to be executed by processor 84. Computer system 80 may further include a read only memory (ROM) 88 or other static storage device coupled to bus 82 for storing static information and instructions for processor 84. A storage device 90, such as a magnetic disk or optical disk, may additionally be coupled to bus 82 for storing information and instructions.

Computer system 80 can be coupled via bus 82 to a display 92, such as a cathode ray tube (CRT), liquid crystal display (LCD), active matrix display, light emitting diode (LED)/organic LED (OLED) display, digital light processing (DLP) display, or plasma display, for displaying information to a computer user. An input device 94, such as a keyboard including alphanumeric and other keys, may be coupled to bus 82 for communicating information and command selections to processor 84. Another type of user input device is cursor control 96, such as a mouse, a trackball, or cursor direction keys for communicating direction information and command selections to processor 84 and for controlling cursor movement on display 92.

According to one embodiment of the invention, dynamic bandwidth management, in accordance with example embodiments, are provided by computer system 80 in response to processor 84 executing an arrangement of instructions contained in main memory 86. Such instructions can be read into main memory 86 from another computer-readable medium, such as storage device 90. Execution of the arrangement of instructions contained in main memory 86 causes processor 84 to perform one or more processes described herein. One or more processors in a multi-processing arrangement may also be employed to execute the instructions contained in main memory 86. In alternative embodiments, hard-wired circuitry is used in place of or in combination with software instructions to implement various embodiments. Thus, embodiments described in the present disclosure are not limited to any specific combination of hardware circuitry and software.

Computer system 80 may also include a communication interface 98 coupled to bus 82. Communication interface 98 can provide a two-way data communication coupling to a network link 100 connected to a local network 102. By way of example, communication interface 98 may be a digital subscriber line (DSL) card or modem, an integrated services digital network (ISDN) card, a cable modem, or a telephone modem to provide a data communication connection to a corresponding type of telephone line. As another example, communication interface 98 may be a local area network (LAN) card (e.g. for Ethernet™ or an Asynchronous Transfer Model (ATM) network) to provide a data communication connection to a compatible LAN. Wireless links can also be implemented. In any such implementation, communication interface 98 sends and receives electrical, electromagnetic, or optical signals that carry digital data streams representing various types of information. Further, communication interface 98 may include peripheral interface devices, such as a Universal Serial Bus (USB) interface, a PCMCIA (Personal Computer Memory Card International Association) interface, etc.

Network link 100 typically provides data communication through one or more networks to other data devices. By way of example, network link 100 can provide a connection through local network 102 to a host computer 104, which has connectivity to a network 106 (e.g. a wide area network (WAN) or the global packet data communication network now commonly referred to as the "Internet") or to data equipment operated by service provider. Local network 102 and network 106 may both use electrical, electromagnetic, or optical signals to convey information and instructions. The signals through the various networks and the signals on network link 100 and through communication interface 98, which communicate digital data with computer system 80, are example forms of carrier waves bearing the information and instructions.

Computer system 80 may send messages and receive data, including program code, through the network(s), network link 100, and communication interface 98. In the Internet example, a server (not shown) might transmit requested code belonging to an application program for implementing an embodiment of the present invention through network 106, local network 102 and communication interface 98. Processor 84 executes the transmitted code while being received and/or store the code in storage device 90, or other non-volatile storage for later execution. In this manner, computer system 80 obtains application code in the form of a carrier wave.

The term "computer-readable medium" as used herein refers to any medium that participates in providing instructions to processor 84 for execution. Such a medium may take many forms, including but not limited to non-volatile media, volatile media, and transmission media. Non-volatile media include, for example, optical or magnetic disks, such as storage device 90. Volatile media may include dynamic memory, such as main memory 86. Transmission media may include coaxial cables, copper wire and fiber optics, including the wires that comprise bus 82. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 11:
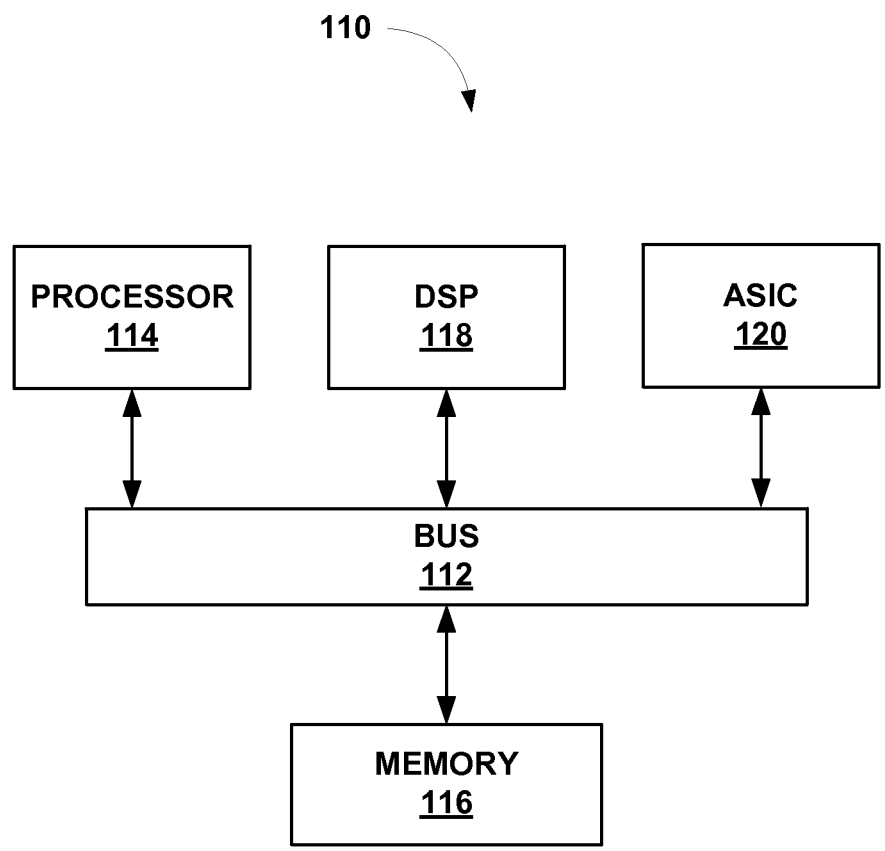
FIG. 11 illustrates an example chip set that can be utilized in implementing architectures and methods for dynamic bandwidth allocation in accordance with various embodiments.

FIG. 11 illustrates a chip set 110 in which embodiments of the invention may be implemented. Chip set 110 can include, for instance, processor and memory components described with respect to FIG. 10 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 110 includes a communication mechanism such as a bus 112 for passing information among the components of the chip set 110. A processor 114 has connectivity to bus 112 to execute instructions and process information stored in a memory 116. Processor 114 includes one or more processing cores with each core configured to perform independently. A multi-core processor enables multiprocessing within a single physical package. Examples of a multi-core processor include two, four, eight, or greater numbers of processing cores. Alternatively or in addition, processor 114 includes one or more microprocessors configured in tandem via bus 112 to enable independent execution of instructions, pipelining, and multithreading. Processor 114 may also be accompanied with one or more specialized components to perform certain processing functions and tasks such as one or more digital signal processors (DSP) 118, and/or one or more application-specific integrated circuits (ASIC) 1010. DSP 118 can typically be configured to process real-world signals (e.g., sound) in real time independently of processor 114. Similarly, ASIC 120 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 114 and accompanying components have connectivity to the memory 116 via bus 112. Memory 116 includes both dynamic memory (e.g., RAM) and static memory (e.g., ROM) for storing executable instructions that, when executed by processor 114, DSP 118, and/or ASIC 120, perform the process of example embodiments as described herein. Memory 116 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 80. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
receiving, from a plurality of inroute group managers (IGMs) in a satellite communications network, bandwidth usage data regarding each terminal group (TG) communicating over one or more inroutes of each inroute group (IG) of a plurality of IGs managed by an IGM of the plurality of IGMs, wherein each of the TGs comprises one or more satellite terminals and a subscribed rate corresponding to an aggregate bandwidth consumption of the one or more satellite terminals of the TG, wherein at least one of the TGs comprises a plurality of satellite terminals that communicates over the plurality of IGs;

determining a targeted allocation of bandwidth for each of the TGs across each of the plurality of IGMs in the satellite communications network; and calculating a set of scaling factors based on the targeted allocation of bandwidth and a current bandwidth usage of each of the TGs, wherein the set of scaling factors are to be utilized by each of the plurality of IGMs to scale up or down the current bandwidth usage of each of the TGs.

2. The method of claim 1, wherein each of the TGs is throughput-limited based on a subscription rate plan.

3. The method of claim 2, further comprising applying the set of scaling factors to adjust throughput of each of the TGs to achieve the adjustment of each of the IGM's respective bandwidth usage.

4. The method of claim 3, wherein applying the set of scaling factors comprises throttling down the throughput of those TGs of the TGs that have exceeded a maximum throughput limitation of their respective subscription rate plan.

5. The method of claim 3, wherein applying the set of scaling factors comprises increasing the throughput of those TGs of the TGs that are operating below a maximum throughput limitation of their respective subscription rate plan.

6. The method of claim 1, wherein the set of scaling factors dictates the frequency with which the one or more satellite terminals within each TG of the TGs access at least one of a plurality of network resources.

7. The method of claim 6, wherein the plurality of network resources are accessed on one of return uplinks carrying data from the terminals to a plurality of satellites or return downlinks carrying data from the plurality of satellites to the terminals.

8. The method of claim 6, further comprising balancing the plurality of network resources on a per unit period basis.

9. The method of claim 8, wherein the unit period comprises a single super frame comprising 8 frames.

10. The method of claim 1, wherein each of the TGs is assigned a weighting, and wherein the targeted allocation of bandwidth for each of the TGs is based upon at least one of the weighting assigned to the TG and a predetermined maximum throughput rate associated with the TG.

11. A method, comprising
receiving, from a plurality of inroute group managers (IGMs) in a network, bandwidth usage data regarding each terminal group (TG) communicating over one or more inroutes of each inroute group (IG) managed by an IGM of the plurality of IGMs;

determining a targeted allocation of bandwidth for each of the TGs across each of the plurality of IGMs in the network; and calculating a set of scaling factors based on the targeted allocation of bandwidth and a current bandwidth usage of each of the TGs, wherein the set of scaling factors are to be utilized by each of the plurality of IGMs to scale up or down the current bandwidth usage of each of the TGs, wherein determining the targeted allocation of bandwidth for each of the TGs further comprises converting between a measured information rate prior to compression and a measured information rate after compression, the conversion comprising:

determining a ratio of the measured information rate prior to compression and the measured information rate after compression;

receiving, during determination of the targeted allocation of bandwidth allocation, an original information rate of the TG; and applying the ratio to the original information rate of the TG to convert the original information rate of the TG to a carried information rate for the TG.

12. The method of claim 11, wherein the measured information rate prior to compression and measured information rate after compression are accumulated information rates associated with a plurality of user applications involving transmission and reception of data packets over the network.

13. A system, comprising:
a processor; and
a non-transitory computer-readable medium having executable instructions stored thereon that, when executed by the processor, cause the system to:

receive, from a plurality of inroute group managers (IGMs) in a satellite communications network, bandwidth usage data regarding each terminal group (TG) communicating over one or more inroutes of each inroute group (IG) of a plurality of IGs managed by an IGM of the plurality of IGMs, wherein each of the TGs comprises one or more satellite terminals and a subscribed rate corresponding to an aggregate bandwidth consumption of the one or more satellite terminals of the TG, wherein at least one of the TGs comprises a plurality of satellite terminals that communicates over the plurality of IGs;

determine a targeted allocation of bandwidth for each of the TGs across each of the plurality of IGMs in the satellite communications network; and calculate a set of scaling factors based on the targeted allocation of bandwidth and a current bandwidth usage of each of the TGs, wherein the set of scaling factors are to be utilized by each of the plurality of IGMs to scale up or down the current bandwidth usage of each of the TGs.

14. The system of claim 13, wherein each of the TGs is throughput-limited based on a subscription rate plan.

15. The system of claim 14, wherein the instructions when executed by the processor, further cause the system to apply the set of scaling factors to adjust throughput of each of the TGs to achieve the adjustment of each of the IGM's respective bandwidth usage.

16. The system of claim 15, wherein applying the set of scaling factors comprises throttling down the throughput of those TGs of the TGs that have exceeded a maximum throughput limitation of their respective subscription rate plan.

17. The system of claim 15, wherein applying the set of scaling factors comprises increasing the throughput of those TGs of the TGs that are operating below a maximum throughput limitation of their respective subscription rate plan.

18. The system of claim 13, wherein determining the targeted allocation of bandwidth for each of the TGs further comprises converting between a measured information rate prior to compression and a measured information rate after compression, the conversion comprising:
- determining a ratio of the measured information rate prior to compression and the measured information rate after compression;
- receiving, during determination of the targeted allocation of bandwidth allocation, an original information rate of the TG; and
- applying the ratio to the original information rate of the TG to convert the original information rate of each TG to a carried information rate for the TG.

19. The system of claim 13, wherein the set of scaling factors dictates the frequency with which the one or more satellite terminals within each TG of the TGs access at least one of a plurality of network resources, wherein the instructions when executed by the processor, further cause the system to balance the plurality of network resources on a per unit period basis.

20. The system of claim 13, wherein each of the TGs is assigned a weighting, and wherein the targeted allocation of bandwidth for each of the TGs is based upon at least one of the weighting assigned to the TG and a predetermined maximum throughput rate associated with the TG.

* * * * *